US012456471B2

(12) United States Patent
Tsuji et al.

(10) Patent No.: US 12,456,471 B2
(45) Date of Patent: Oct. 28, 2025

(54) ENCODING DEVICE AND METHOD, DECODING DEVICE AND METHOD, AND PROGRAM

(71) Applicant: Sony Group Corporation, Tokyo (JP)

(72) Inventors: Minoru Tsuji, Chiba (JP); Toru Chinen, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 13 days.

(21) Appl. No.: 17/790,455

(22) PCT Filed: Dec. 25, 2020

(86) PCT No.: PCT/JP2020/048729

§ 371 (c)(1),
(2) Date: Jun. 30, 2022

(87) PCT Pub. No.: WO2021/140959

PCT Pub. Date: Jul. 15, 2021

(65) Prior Publication Data

US 2023/0056690 A1 Feb. 23, 2023

(30) Foreign Application Priority Data

Jan. 10, 2020 (JP) ................................ 2020-002711

(51) Int. Cl.

*G10L 19/008* (2013.01)
*H04R 3/04* (2006.01)
*H04S 7/00* (2006.01)

(52) U.S. Cl.

CPC .............. *G10L 19/008* (2013.01); *H04R 3/04* (2013.01); *H04S 7/302* (2013.01); *H04S 2400/11* (2013.01); *H04S 2400/13* (2013.01)

(58) Field of Classification Search

CPC ........................... G10L 19/008; H04S 2420/03
See application file for complete search history.

(56) References Cited

U.S. PATENT DOCUMENTS

2010/0083344 A1 4/2010 Schildbach
2011/0224994 A1 9/2011 Erik
(Continued)

FOREIGN PATENT DOCUMENTS

CN 102737635 A 10/2012
JP 2006-140595 A 6/2006
(Continued)

OTHER PUBLICATIONS

International Search Report and English translation thereof mailed Mar. 16, 2021 in connection with International Application No. PCT/JP2020/048729.
(Continued)

*Primary Examiner* — Ping Lee
(74) *Attorney, Agent, or Firm* — Wolf, Greenfield & Sacks, P.C.

(57) ABSTRACT

The present technology relates to an encoding device and method, a decoding device and method, and a program capable of realizing sense-of-distance control based on intention of a content creator.
The encoding device includes: an object encoding unit that encodes audio data of an object; a metadata encoding unit that encodes metadata including position information of the object; a sense-of-distance control information determination unit that determines sense-of-distance control information for sense-of-distance control processing to be performed on the audio data; a sense-of-distance control information encoding unit that encodes the sense-of-distance control information; and a multiplexer that multiplexes the coded audio data, the coded metadata, and the coded sense-of-distance control information to generate coded data. The present technology can be applied to a content reproduction system.

18 Claims, 23 Drawing Sheets

(56) References Cited

U.S. PATENT DOCUMENTS

| | | | | |
|---|---|---|---|---|
| 2014/0105429 | A1 | 4/2014 | Kim | |
| 2016/0080884 | A1 | 3/2016 | Song | |
| 2016/0125887 | A1 | 5/2016 | Purnhagen | |
| 2021/0127224 | A1* | 4/2021 | Laaksonen | H04S 7/304 |
| 2021/0168550 | A1* | 6/2021 | Terentiv | H04S 7/303 |
| 2021/0289310 | A1* | 9/2021 | Herre | G06F 3/012 |

FOREIGN PATENT DOCUMENTS

| | | | |
|---|---|---|---|
| JP | 2013-021686 | A | 1/2013 |
| WO | WO 2015/107926 | A1 | 7/2015 |
| WO | WO 2018/047667 | A1 | 3/2018 |
| WO | WO-2019004524 | A1 | 1/2019 |
| WO | WO-2019012133 | A1 | 1/2019 |
| WO | WO-2019078034 | A1 | 4/2019 |
| WO | WO-2019078035 | A1 | 4/2019 |
| WO | WO-2019197404 | A1 | 10/2019 |

OTHER PUBLICATIONS

[No Author Listed], Information technology—High efficiency coding and media delivery in heterogeneous environments—Part 3: 3D audio. ISO/IEC JTC 1/SC 29, Jul. 25, 2014; ISO/IEC 23008-3. 433 pages.

Pulkki, Virtual sound source positioning using vector base amplitude panning. Journal of the audio engineering society. Jun. 1997;45(6):456-66.

International Written Opinion and English translation thereof mailed Mar. 16, 2021 in connection with International Application No. PCT/JP2020/048729. 6 pages.

International Preliminary Report on Patentability and English translation thereof mailed Jul. 21, 2022 in connection with International Application No. PCT/JP2020/048729. 9 pages.

Extended European Search Report issued Dec. 23, 2022 in connection with European Application No. 20912607.7. 11 pages.

* cited by examiner

Q12

| Distance | Min | D0 | D1 | Max |
|---|---|---|---|---|
| Gain | 0.0 | 0.0 | −40.0 | −40.0 |

Q21

Q22

| Distance | Min | $D_0$ | $D_1$ | $D_2$ | $D_3$ | $D_4$ | Max |
|---|---|---|---|---|---|---|---|
| Type | High Shelving | | | | | | |
| Fc | 6kHz | 6kHz | 6kHz | 6kHz | 6kHz | 6kHz | 6kHz |
| Q | 2.0 | 2.0 | 2.0 | 2.0 | 2.0 | 2.0 | 2.0 |
| Gain | 0.0 | 0.0 | -1.0 | -3.0 | -6.0 | -12.0 | -12.0 |

Q32

| Distance | Min | $D_0$ | $D_1$ | Max |
|---|---|---|---|---|
| Type | Low Shelving | | | |
| Fc | 200Hz | 200Hz | 200Hz | 200Hz |
| Q | 2.0 | 2.0 | 2.0 | 2.0 |
| Gain | +3.0 | +3.0 | 0.0 | 0.0 |

Q42

| Distance | Min | $D_0$ | $D_1$ | Max |
|---|---|---|---|---|
| Wet Gain | −Inf | −Inf | −3.0 | −3.0 |

Q52

| Distance | Min | $D_0$ | Max |
|---|---|---|---|
| OFFSET ANGLE OF WET COMPONENT (LEFT) [°] | 120 | 45 | 45 |
| OFFSET ANGLE OF WET COMPONENT (RIGHT) [°] | −120 | −45 | −45 |

FIG. 11

| Syntax | No. of bytes | Data format |
|---|---|---|
| DistanceRender(){ | | |
| **DistanceRender_Attn();** | | |
| **DistanceRender_Filt();** | | |
| **DistanceRender_Filt();** | | |
| **DistanceRender_Revb();** | | |
| } | | |

*FIG. 12*

| Syntax | No. of bytes | Data format |
|---|---|---|
| DistanceRender_Attn() { | | |
| **num_points**; | 1 | unsigned char |
| for (i = 0; i < num_points; i++) { | | |
| **distance[i]**; | 4 | float |
| **gain[i]**; | 4 | float |
| } | | |

FIG. 13

| Syntax | No. of bytes | Data format |
|---|---|---|
| DistanceRender_Filt() { | | |
|   **filt_type**; | 1 | unsigned char |
|   **num_points**; | 1 | unsigned char |
|   for (i = 0; i < num_points; i++) { | | |
|     **distance[i]**; | 4 | float |
|     **freq[i]**; | 4 | float |
|     **Q[i]**; | 4 | float |
|     **gain[i]**; | 4 | float |
|   } | | |
| } | | |

FIG. 14

| Syntax | No. of bytes | Data format |
| --- | --- | --- |
| DistRender_Revb() { | | |
| **num_points**; | 1 | unsigned char |
| for (i = 0; i < num_points; i++) { | | |
| **distance[i]**; | 4 | float |
| **wet_gain[i]**; | 4 | float |
| for (j = 0; j < num_wetobjs; i++) { | | |
| **wet_azimuth_offset[i][j]**; | 4 | float |
| **wet_elevation_offset[i][j]**; | 4 | float |
| } | | |
| } | | |

FIG. 17

| index | DISTANCE BETWEEN OBJECT AND LISTENING POSITION d[m] | | | | | | | | | | | | | |
|---|---|---|---|---|---|---|---|---|---|---|---|---|---|---|
| | Min | 0.1 | 0.2 | ... | 1.0 | 2.0 | ... | 10.0 | 20.0 | ... | 100.0 | 200.0 | ... | Max |
| 0 | Gain[dB]=20*log10(1/d) | | | | | | | | | | | | | |
| 1 | Gain[dB]=20*log10(1/d)$^2$ | | | | | | | | | | | | | |
| 2 | 10.0 | 10.0 | 6.99 | ... | 0 | −3.01 | ... | −10.0 | −13.0 | ... | −20.0 | −23.0 | ... | −Inf |
| 3 | 20.0 | 20.0 | 14.0 | ... | 0 | −6.02 | ... | −20.0 | −32.0 | ... | −46.0 | −52.0 | ... | −Inf |

FIG. 18

| Syntax | No. of bytes | Data format |
| --- | --- | --- |
| DistanceRender_Attn() { | | |
| **Index**; | 1 | unsigned char |
| } | | |

FIG. 19

| Syntax | No. of bytes | Data format |
| --- | --- | --- |
| DistanceRender(){ | | |
| for (i = 0; i < num_objs; i++) { | | |
| **isDistanceRenderFlg**; | 1 | unsigned char |
| if (isDistanceRenderFlg) { | | |
| DistanceRender_Attn(); | | |
| DistanceRender_Filt(); | | |
| DistanceRender_Filt(); | | |
| DistanceRender_Revb(); | | |
| } | | |
| } | | |
| } | | |

FIG. 20

| Syntax | No. of bytes | Data format |
| --- | --- | --- |
| DistanceRender(){ | | |
| for (i = 0; i < num_obj_groups; i++) { | | |
| **isDistanceRenderFlg**; | 1 | unsigned char |
| if (isDistanceRenderFlg) { | | |
| DistanceRender_Attn(); | | |
| DistanceRender_Filt(); | | |
| DistanceRender_Filt(); | | |
| DistanceRender_Revb(); | | |
| } | | |
| } | | |
| } | | |

FIG. 22

| Syntax | No. of bytes | Data format |
|---|---|---|
| DistanceRender(){ | | |
| for (i = 0; i < num_objs; i++) { | | |
| **isDistanceRenderFlg**; | 1 | unsigned char |
| | | |
| if (isDistanceRenderFlg) { | | |
| for (j = 0; j < 4; j++) { | | |
| **proc_id**; | 1 | unsigned char |
| switch(proc_id) { | | |
| case ATTN: | | |
| **DistanceRender_Attn()**; break; | | |
| case FILT: | | |
| **DistanceRender_Filt()**; break; | | |
| case REVB: | | |
| **DistanceRender_Revb()**; break; | | |
| case USER_DEFINE: | | |
| **DistanceRender_UserDefine()**; break; | | |
| case NONE: | | |
| break; | | |
| } | | |
| } | | |
| } | | |

ENCODING DEVICE AND METHOD, DECODING DEVICE AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/048729, filed in the Japanese Patent Office as a Receiving Office on Dec. 25, 2020, which claims priority to Japanese Patent Application Number JP2020-002711, filed in the Japanese Patent Office on Jan. 10, 2020, each of which is hereby incorporated by reference in its entirety.

TECHNICAL FIELD

The present technology relates to an encoding device and method, a decoding device and method, and a program, and more particularly, to an encoding device and method, a decoding device and method, and a program capable of realizing sense-of-distance control based on intention of a content creator.

BACKGROUND ART

In recent years, object-based audio technology has attracted attention.

In object-based audio, data of an object audio is configured by a waveform signal with respect to an audio object and metadata indicating localization information of the audio object represented by a relative position from a listening position serving as a predetermined reference.

Then, the waveform signal of the audio object is rendered into signals of a desired number of channels by, for example, vector based amplitude panning (VBAP) on the basis of the metadata and reproduced (see, for example, Non Patent Document 1 and Non Patent Document 2).

Furthermore, as a technology related to the object-based audio, for example, a technology for realizing audio reproduction with a higher degree of freedom in which a user can designate an arbitrary listening position has also been proposed (see, for example, Patent Document 1).

In this technology, the position information of the audio object is corrected according to the listening position, and gain control or filter processing is performed according to a change in a distance from the listening position to the audio object, so that a change in frequency characteristics or volume accompanying a change in the listening position of the user, that is, a sense of distance to the audio object is reproduced.

CITATION LIST

Non Patent Document

Non Patent Document 1: ISO/IEC 23008-3 Information technology—High efficiency coding and media delivery in heterogeneous environments—Part 3:3D audio Non Patent Document 2: Ville Pulkki, "Virtual Sound Source Positioning Using Vector Base Amplitude Panning", Journal of AES, vol. 45, no. 6, pp. 456-466, 1997

Patent Document

Patent Document 1: WO 2015/107926 A

SUMMARY OF THE INVENTION

Problems to be Solved by the Invention

However, in the above-described technology, the gain control and the filter processing for reproducing the change in frequency characteristics and volume corresponding to the distance from the listening position to the audio object are predetermined.

Therefore, when a content creator desires to reproduce a sense of distance based on the change in frequency characteristics and volume in a different way therefrom, such a sense of distance cannot be reproduced. That is, it is not possible to realize sense-of-distance control based on the intention of the content creator.

The present technology has been made in view of such a situation, and an object thereof is to realize the sense-of-distance control based on the intention of the content creator.

Solutions to Problems

An encoding device according to a first aspect of the present technology includes: an object encoding unit that encodes audio data of an object; a metadata encoding unit that encodes metadata including position information of the object; a sense-of-distance control information determination unit that determines sense-of-distance control information for sense-of-distance control processing to be performed on the audio data; a sense-of-distance control information encoding unit that encodes the sense-of-distance control information; and a multiplexer that multiplexes the coded audio data, the coded metadata, and the coded sense-of-distance control information to generate coded data.

An encoding method or a program according to the first aspect of the present technology includes the steps of: encoding audio data of an object; encoding metadata including position information of the object; determining sense-of-distance control information for sense-of-distance control processing to be performed on the audio data; encoding the sense-of-distance control information; and multiplexing the coded audio data, the coded metadata, and the coded sense-of-distance control information to generate coded data.

In the first aspect of the present technology, the audio data of the object is encoded, the metadata including the position information of the object is encoded, the sense-of-distance control information for the sense-of-distance control processing to be performed on the audio data is determined, the sense-of-distance control information is encoded, and the coded audio data, the coded metadata, and the coded sense-of-distance control information are multiplexed to generate the coded data.

A decoding device according to a second aspect of the present technology includes: a demultiplexer that demultiplexes coded data to extract coded audio data of an object, coded metadata including position information of the object, and coded sense-of-distance control information for sense-of-distance control processing to be performed on the audio data; an object decoding unit that decodes the coded audio data; a metadata decoding unit that decodes the coded metadata; a sense-of-distance control information decoding unit that decodes the coded sense-of-distance control information; a sense-of-distance control processing unit that performs the sense-of-distance control processing on the audio data of the object on the basis of the sense-of-distance control information; and a rendering processing unit that performs rendering processing on the basis of the audio data obtained by the sense-of-distance control processing and the metadata to generate reproduction audio data for reproducing a sound of the object.

A decoding method or a program according to the second aspect of the present technology includes the steps of: demultiplexing coded data to extract coded audio data of an object, coded metadata including position information of the object, and coded sense-of-distance control information for sense-of-distance control processing to be performed on the audio data; decoding the coded audio data; decoding the coded metadata; decoding the coded sense-of-distance control information; performing the sense-of-distance control processing on the audio data of the object on the basis of the sense-of-distance control information; and performing rendering processing on the basis of the audio data obtained by the sense-of-distance control processing and the metadata to generate reproduction audio data for reproducing a sound of the object.

In the second aspect of the present technology, the coded data is demultiplexed to extract the coded audio data of the object, the coded metadata including the position information of the object, and the coded sense-of-distance control information for the sense-of-distance control processing to be performed on the audio data, the coded audio data is decoded, the coded metadata is decoded, the coded sense-of-distance control information is decoded, the sense-of-distance control processing is performed on the audio data of the object on the basis of the sense-of-distance control information, and the rendering processing is performed on the basis of the audio data obtained by the sense-of-distance control processing and the metadata to generate the reproduction audio data for reproducing the sound of the object.

BRIEF DESCRIPTION OF DRAWINGS

FIG. 11 is a diagram illustrating an example of sense-of-distance control information.

FIG. 12 is a diagram illustrating an example of parameter configuration information of the gain control.

FIG. 13 is a diagram illustrating an example of parameter configuration information of the filter processing.

FIG. 14 is a diagram illustrating an example of parameter configuration information of the reverb processing.

FIG. 17 is a diagram illustrating an example of a table and a function for obtaining a gain value.

FIG. 18 is a diagram illustrating an example of the parameter configuration information of the gain control.

FIG. 19 is a diagram illustrating an example of the sense-of-distance control information.

FIG. 20 is a diagram illustrating an example of the sense-of-distance control information.

FIG. 22 is a diagram illustrating an example of the sense-of-distance control information.

MODE FOR CARRYING OUT THE INVENTION

Figure 1:
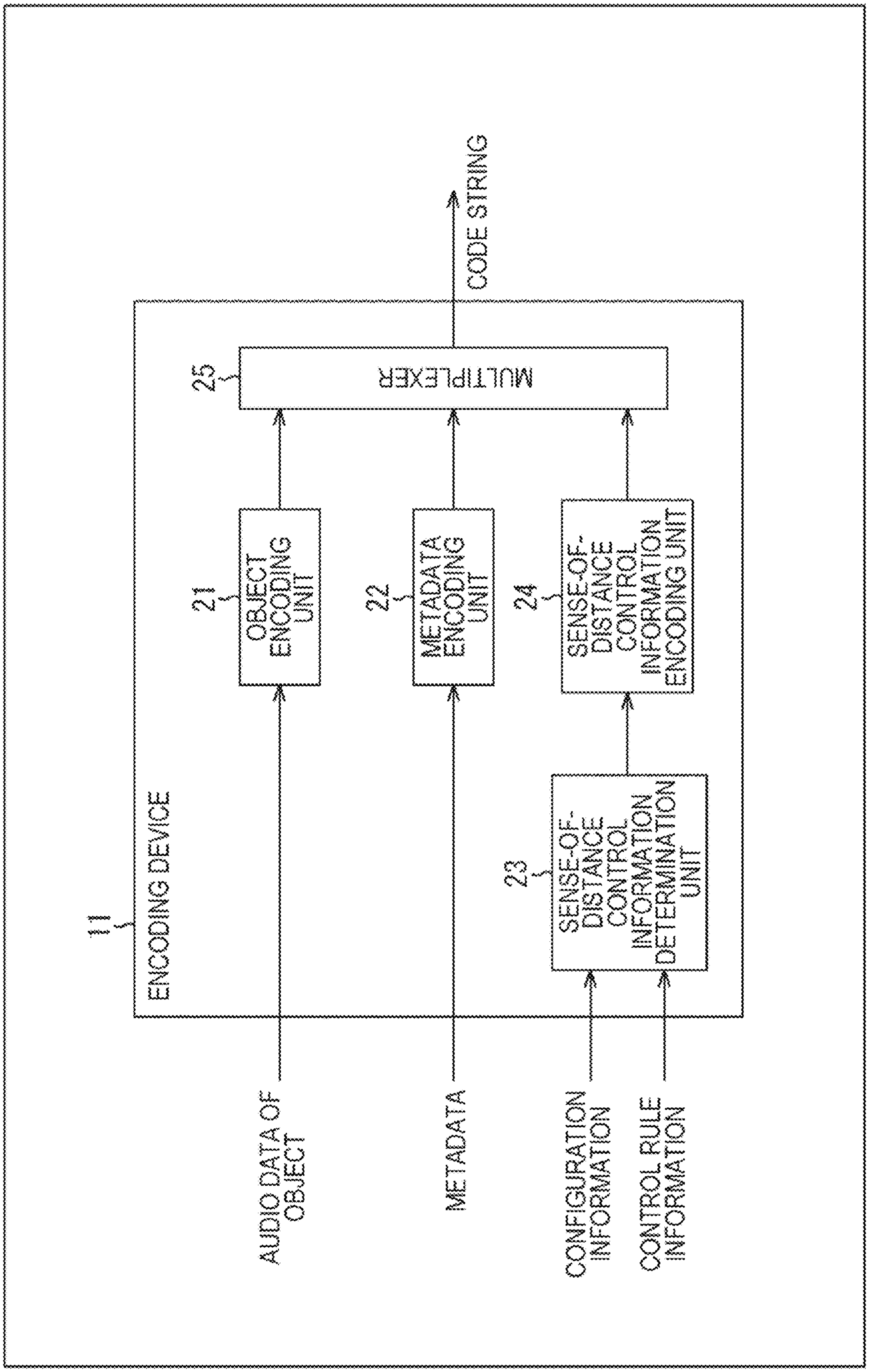
FIG. 1 is a diagram illustrating a configuration example of an encoding device.

Hereinafter, embodiments to which the present technology is applied will be described with reference to the drawings.

First Embodiment

<Configuration Example of Encoding Device>

The present technology relates to reproduction of audio content of object-based audio including sounds of one or more audio objects.

Hereinafter, the audio object is also simply referred to as an object, and the audio content is also simply referred to as content.

In the present technology, sense-of-distance control information for sense-of-distance control processing which is set by a content creator and reproduces a sense of distance from a listening position to the object is transmitted to a decoding side together with the audio data of the object. Therefore, it is possible to realize sense-of-distance control based on an intention of the content creator.

Here, the sense-of-distance control processing is processing for reproducing a sense of distance from a listening position to an object when reproducing a sound of the object, that is, processing for adding the sense of distance to the sound of the object, and is signal processing realized by executing arbitrary one or more processing steps in combination.

Specifically, for example, in the sense-of-distance control processing, gain control processing for audio data, filter processing for adding frequency characteristics and various acoustic effects, reverb processing, and the like are performed.

Information for enabling the decoding side to reconfigure such sense-of-distance control processing is sense-of-distance control information, and the sense-of-distance control information includes configuration information and control rule information. In other words, the sense-of-distance control information includes the configuration information and the control rule information.

For example, the configuration information configuring the sense-of-distance control information is information which is obtained by parameterizing the configuration of the sense-of-distance control processing set by the content creator and indicates one or more signal processing steps to be performed in combination to realize the sense-of-distance control processing.

More specifically, the configuration information indicates the number of signal processing steps included in the sense-of-distance control processing, processing executed in such signal processing, and the order of the processing.

Note that, in a case where one or more signal processing steps configuring the sense-of-distance control processing and the order of performing these signal processing steps are determined in advance, the sense-of-distance control information does not necessarily need to include the configuration information.

Furthermore, the control rule information is information for obtaining a parameter which is obtained by parameterizing a control rule, which is set by the content creator, in each of the signal processing steps configuring the sense-of-distance control processing and is used in each of the signal processing steps configuring the sense-of-distance control processing.

More specifically, the control rule information indicates the parameter which is used for each of the signal processing steps configuring the sense-of-distance control processing and the control rule in which the parameter changes according to the distance from the listening position to the object.

On the encoding side, such sense-of-distance control information and the audio data of each object are encoded and transmitted to the decoding side.

Furthermore, on the decoding side, the sense-of-distance control processing is reconfigured on the basis of the sense-of-distance control information, and the sense-of-distance control processing is performed on the audio data of each object.

At this time, the parameter corresponding to the distance from the listening position to the object is determined on the basis of the control rule information included in the sense-of-distance control information, and the signal processing configuring the sense-of-distance control processing is performed on the basis of the parameter.

Then, 3D audio rendering processing is performed on the basis of the audio data obtained by the sense-of-distance control processing, and reproduction audio data for reproducing the sound of the content, that is, the sound of the object is generated.

Hereinafter, a more specific embodiment to which the present technology is applied will be described.

For example, a content reproduction system to which the present technology is applied includes an encoding device that encodes the audio data of each of one or more objects included in content and the sense-of-distance control information to generate coded data, and a decoding device that receives supply of the coded data to generate reproduction audio data.

An encoding device configuring such a content reproduction system is configured as illustrated in FIG. 1, for example.

An encoding device 11 illustrated in FIG. 1 includes an object encoding unit 21, a metadata encoding unit 22, a sense-of-distance control information determination unit 23, a sense-of-distance control information encoding unit 24, and a multiplexer 25.

The audio data of each of one or more objects included in the content is supplied to the object encoding unit 21. The audio data is a waveform signal (audio signal) for reproducing the sound of the object.

The object encoding unit 21 encodes the supplied audio data of each object, and supplies the resultant coded audio data to the multiplexer 25.

The metadata of the audio data of each object is supplied to the metadata encoding unit 22.

The metadata includes at least position information indicating an absolute position of the object in a space. The position information is coordinates indicating the position of the object in an absolute coordinate system, that is, for example, a three-dimensional orthogonal coordinate system based on a predetermined position in the space. Furthermore, the metadata may include gain information or the like for performing gain control (gain correction) on the audio data of the object.

The metadata encoding unit 22 encodes the supplied metadata of each object, and supplies the resultant coded metadata to the multiplexer 25.

The sense-of-distance control information determination unit 23 determines the sense-of-distance control information according to a designation operation or the like by the user, and supplies the determined sense-of-distance control information to the sense-of-distance control information encoding unit 24.

For example, the sense-of-distance control information determination unit 23 acquires the configuration information and the control rule information designated by the user according to the designation operation by the user, thereby determining the sense-of-distance control information including the configuration information and the control rule information.

Furthermore, for example, the sense-of-distance control information determination unit 23 may determine the sense-of-distance control information on the basis of the audio data of each object of the content, information regarding the content such as a genre of the content, information regarding a reproduction space of the content, and the like.

Note that, in a case where each of the signal processing steps configuring the sense-of-distance control processing and the processing order of the signal processing steps are known on the decoding side, the configuration information may not be included in the sense-of-distance control information.

The sense-of-distance control information encoding unit 24 encodes the sense-of-distance control information supplied from the sense-of-distance control information determination unit 23, and supplies the resultant coded sense-of-distance control information to the multiplexer 25.

The multiplexer 25 multiplexes the coded audio data supplied from the object encoding unit 21, the coded metadata supplied from the metadata encoding unit 22, and the coded sense-of-distance control information supplied from the sense-of-distance control information encoding unit 24 to generate coded data (code string). The multiplexer 25 sends (transmits) the coded data obtained by the multiplexing to the decoding device via a communication network or the like.

<Configuration Example of Decoding Device>

Figure 2:
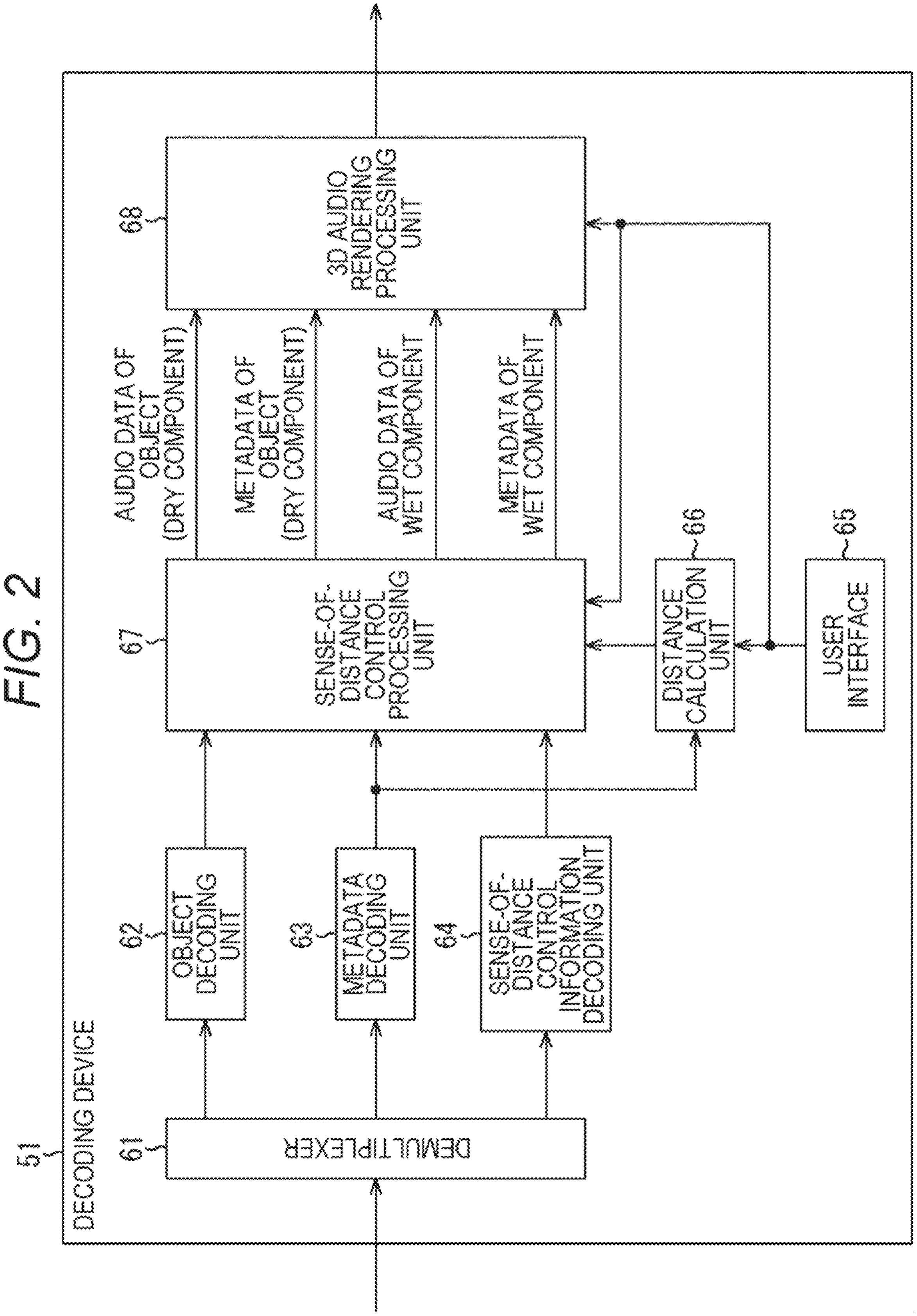
FIG. 2 is a diagram illustrating a configuration example of a decoding device.

Furthermore, the decoding device included in the content reproduction system is configured as illustrated in FIG. 2, for example.

A decoding device 51 illustrated in FIG. 2 includes a demultiplexer 61, an object decoding unit 62, a metadata decoding unit 63, a sense-of-distance control information decoding unit 64, a user interface 65, a distance calculation unit 66, a sense-of-distance control processing unit 67, and a 3D audio rendering processing unit 68.

The demultiplexer 61 receives the coded data sent from the encoding device 11, and demultiplexes the received coded data to extract the coded audio data, the coded metadata, and the coded sense-of-distance control information from the coded data.

The demultiplexer 61 supplies the coded audio data to the object decoding unit 62, supplies the coded metadata to the metadata decoding unit 63, and supplies the coded sense-of-distance control information to the sense-of-distance control information decoding unit 64.

The object decoding unit 62 decodes the coded audio data supplied from the demultiplexer 61, and supplies the resultant audio data to the sense-of-distance control processing unit 67.

The metadata decoding unit 63 decodes the coded metadata supplied from the demultiplexer 61, and supplies the resultant metadata to the sense-of-distance control processing unit 67 and the distance calculation unit 66.

The sense-of-distance control information decoding unit 64 decodes the coded sense-of-distance control information supplied from the demultiplexer 61, and supplies the resultant sense-of-distance control information to the sense-of-distance control processing unit 67.

The user interface 65 supplies listening position information indicating the listening position designated by the user to the distance calculation unit 66, the sense-of-distance control processing unit 67, and the 3D audio rendering processing unit 68, for example, according to an operation of the user or the like.

Here, the listening position indicated by the listening position information is the absolute position of a listener who listens to the sound of the content in the reproduction space. For example, the listening position information is coordinates indicating a listening position in the same absolute coordinate system as that of the position information of the object included in the metadata.

The distance calculation unit 66 calculates the distance from the listening position to the object for every object on the basis of the metadata supplied from the metadata decoding unit 63 and the listening position information supplied from the user interface 65, and supplies distance information indicating the calculation result to the sense-of-distance control processing unit 67.

On the basis of the metadata supplied from the metadata decoding unit 63, the sense-of-distance control information supplied from the sense-of-distance control information decoding unit 64, the listening position information supplied from the user interface 65, and the distance information supplied from the distance calculation unit 66, the sense-of-distance control processing unit 67 performs the sense-of-distance control processing on the audio data supplied from the object decoding unit 62.

At this time, the sense-of-distance control processing unit 67 obtains a parameter on the basis of the control rule information and the distance information, and performs the sense-of-distance control processing on the audio data on the basis of the obtained parameter.

By such sense-of-distance control processing, the audio data of a dry component and the audio data of a wet component of the object are generated.

Here, the audio data of the dry component is audio data, which is obtained by performing one or more processing steps on the audio data of the original object, such as a direct sound component of the object.

The metadata of the original object, that is, the metadata output from the metadata decoding unit 63 is used as the metadata of the audio data of the dry component.

Furthermore, the audio data of the wet component is audio data, which is obtained by performing one or more processing steps on the audio data of the original object, such as a reverberation component of the sound of the object.

Therefore, it can be said that generating the audio data of the wet component is generating the audio data of a new object related to the original object.

In the sense-of-distance control processing unit 67, necessary data of the metadata of the original object, the control rule information, the distance information, and the listening position information is appropriately used to generate the metadata of the audio data of the wet component.

This metadata includes position information indicating at least the position of the object of the wet component.

For example, the position information of the object of the wet component is polar coordinates expressed by an angle in a horizontal direction (horizontal angle) indicating the position of the object as viewed from the listener in the reproduction space, an angle in a height direction (vertical angle), and a radius indicating a distance from the listening position to the object.

The sense-of-distance control processing unit 67 supplies the audio data and the metadata of the dry component and the audio data and the metadata of the wet component to the 3D audio rendering processing unit 68.

The 3D audio rendering processing unit 68 performs the 3D audio rendering processing on the basis of the audio data and the metadata supplied from the sense-of-distance control processing unit 67 and the listening position information supplied from the user interface 65, and generates reproduction audio data.

For example, the 3D audio rendering processing unit 68 performs VBAP, which is rendering processing in a polar coordinate system, or the like as the 3D audio rendering process.

In this case, for the audio data of the dry component, the 3D audio rendering processing unit 68 generates position information expressed by polar coordinates on the basis of the position information included in the metadata of the object of the dry component and the listening position information, and uses the obtained position information for the rendering process. This position information is polar coordinates expressed by a horizontal angle indicating the relative position of the object as viewed from the listener, a vertical angle, and a radius indicating the distance from the listening position to the object.

By such rendering processing, for example, multichannel reproduction audio data including audio data of channels corresponding to a plurality of speakers configuring a speaker system serving as an output destination is generated.

The 3D audio rendering processing unit 68 outputs the reproduction audio data obtained by the rendering processing to the subsequent stage.

<Configuration Example of Sense-of-Distance Control Processing Unit>

Next, a specific configuration example of the sense-of-distance control processing unit 67 of the decoding device 51 will be described.

Note that, here, an example will be described in which the configuration of the sense-of-distance control processing unit 67, that is, one or more processing steps configuring the sense-of-distance control processing and the order of the processing are determined in advance.

Figure 3:
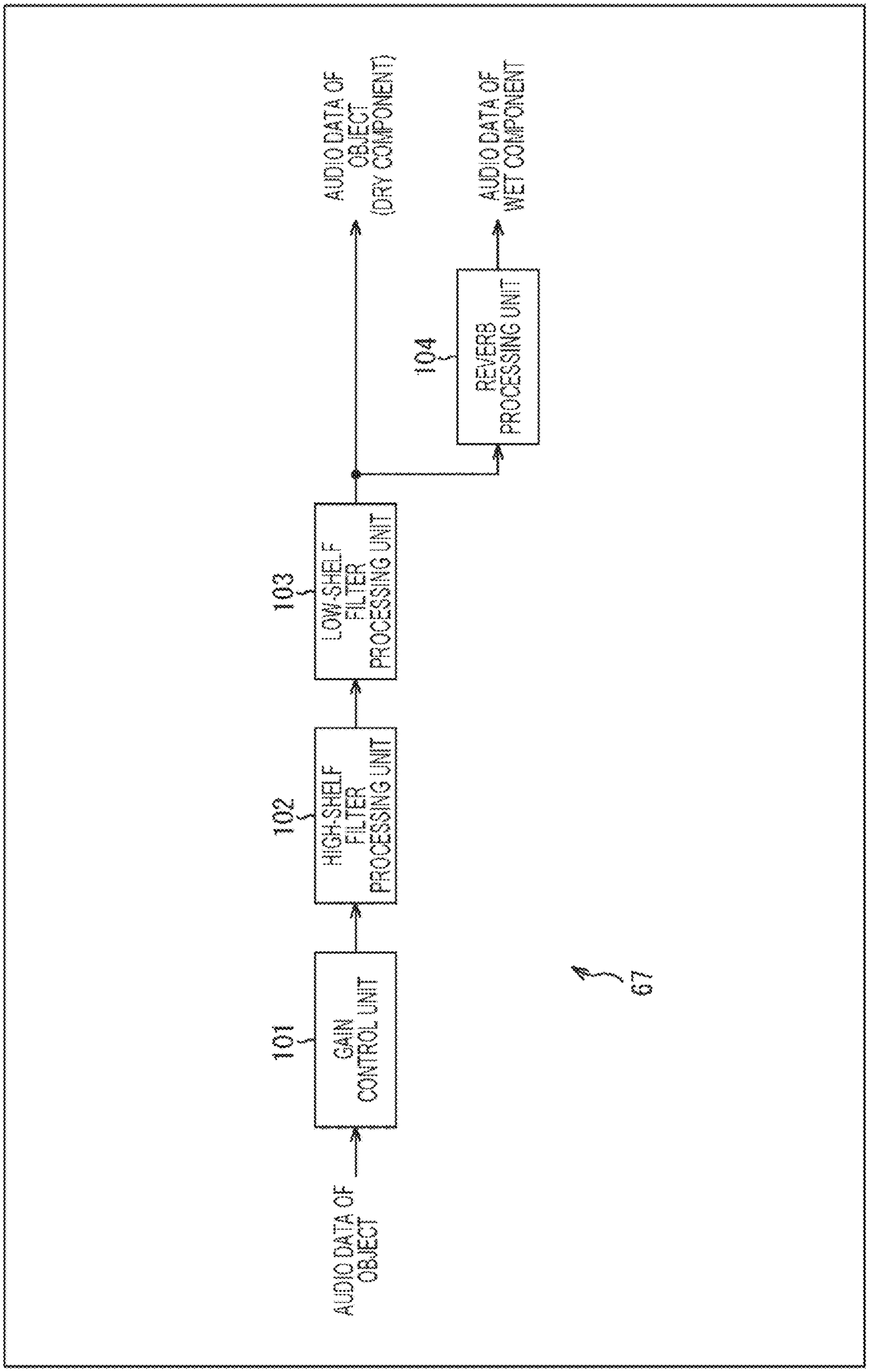
FIG. 3 is a diagram illustrating a configuration example of a sense-of-distance control processing unit.

In such a case, the sense-of-distance control processing unit 67 is configured as illustrated in FIG. 3, for example.

The sense-of-distance control processing unit 67 illustrated in FIG. 3 includes a gain control unit 101, a high-shelf filter processing unit 102, a low-shelf filter processing unit 103, and a reverb processing unit 104.

In this example, gain control processing, filter processing by a high-shelf filter, filter processing by a low-shelf filter, and reverb processing are sequentially executed as the sense-of-distance control processing.

The gain control unit 101 performs gain control on the audio data of the object supplied from the object decoding unit 62 with the parameter (gain value) corresponding to the control rule information and the distance information, and supplies the resultant audio data to the high-shelf filter processing unit 102.

The high-shelf filter processing unit 102 performs filter processing on the audio data supplied from the gain control unit 101 by the high-shelf filter determined by the parameter corresponding to the control rule information and the distance information, and supplies the resultant audio data to the low-shelf filter processing unit 103.

In the filter processing by the high-shelf filter, the high-frequency gain of the audio data is suppressed according to the distance from the listening position to the object.

The low-shelf filter processing unit 103 performs filter processing on the audio data supplied from the high-shelf filter processing unit 102 by the low-shelf filter determined by the parameter corresponding to the control rule information and the distance information.

In the filter processing by the low-shelf filter, the low frequency of the audio data is boosted (emphasized) according to the distance from the listening position to the object.

The low-shelf filter processing unit 103 supplies the audio data obtained by the filter processing to the 3D audio rendering processing unit 68 and the reverb processing unit 104.

Here, the audio data output from the low-shelf filter processing unit 103 is the audio data of the original object described above, that is, the audio data of the dry component of the object.

The reverb processing unit 104 performs reverb processing on the audio data supplied from the low-shelf filter processing unit 103 with the parameter (gain) corresponding to the control rule information and the distance information, and supplies the resultant audio data to the 3D audio rendering processing unit 68.

Here, the audio data output from the reverb processing unit 104 is the audio data of the wet component which is the reverberation component or the like of the original object described above. In other words, the audio data is the audio data of the object of the wet component.

<Configuration Example of Reverb Processing Unit>

Figure 4:
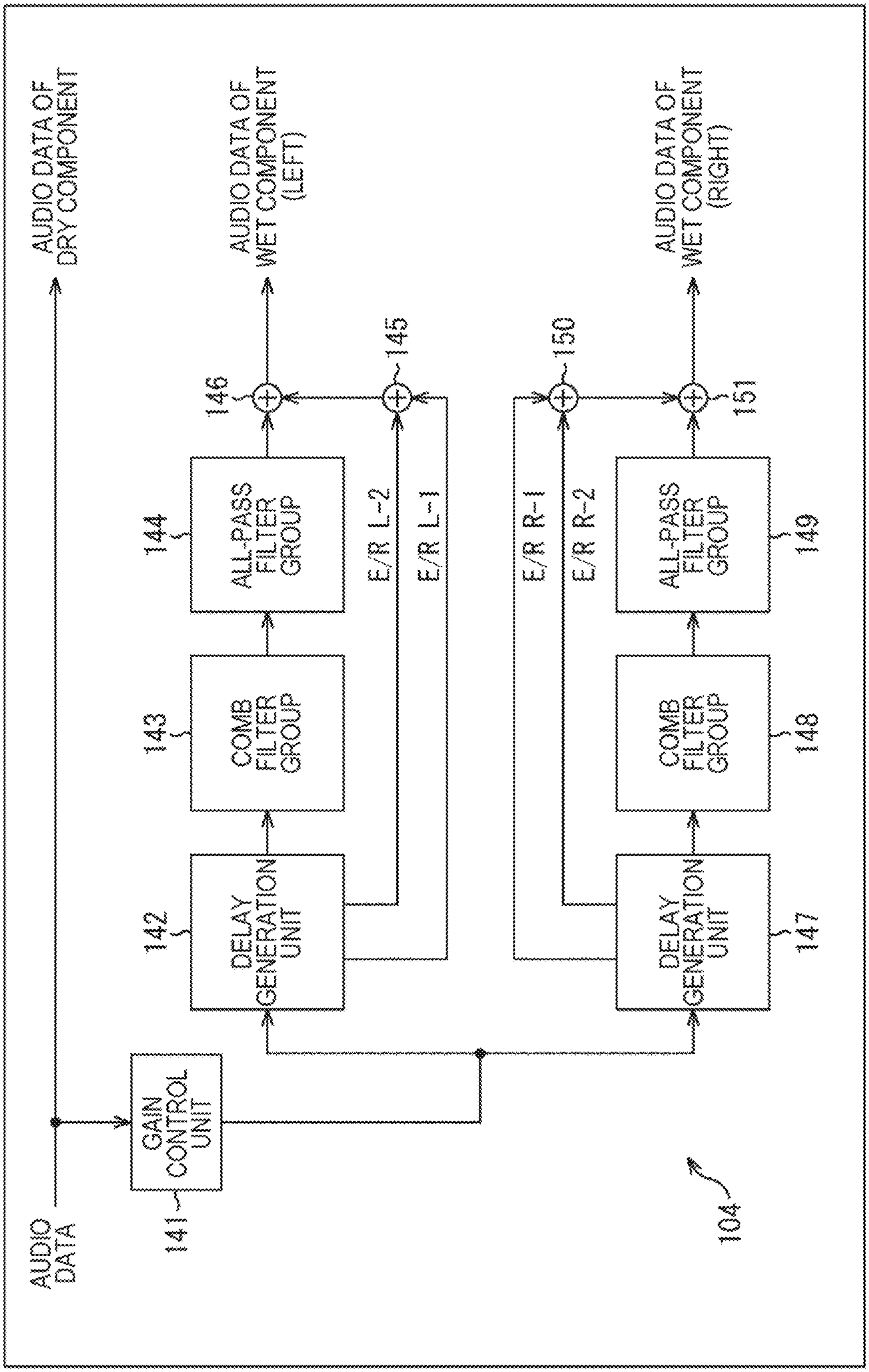
FIG. 4 is a diagram illustrating a configuration example of a reverb processing unit.

Furthermore, more specifically, the reverb processing unit 104 is configured, for example, as illustrated in FIG. 4.

In the example illustrated in FIG. 4, the reverb processing unit 104 includes a gain control unit 141, a delay generation unit 142, a comb filter group 143, an all-pass filter group 144, an addition unit 145, an addition unit 146, a delay generation unit 147, a comb filter group 148, an all-pass filter group 149, an addition unit 150, and an addition unit 151.

In this example, audio data of stereo reverberation components, that is, two wet components positioned on the left and right of the original object is generated for the mono audio data by the reverb processing.

The gain control unit 141 performs gain control processing (gain correction processing) based on the wet gain value obtained from the control rule information and the distance information on the dry component audio data supplied from the low-shelf filter processing unit 103, and supplies the resultant audio data to the delay generation unit 142 and the delay generation unit 147.

The delay generation unit 142 delays the audio data supplied from the gain control unit 141 by holding the audio data for a certain period of time, and supplies the delayed audio data to the comb filter group 143.

Furthermore, the delay generation unit 142 supplies, to the addition unit 145, two pieces of audio data which are obtained by delaying the audio data supplied from the gain control unit 141, have different delay amounts from the audio data supplied to the comb filter group 143, and have different delay amounts from each other.

The comb filter group 143 includes a plurality of comb filters, performs filter processing by the plurality of comb filters on the audio data supplied from the delay generation unit 142, and supplies the resultant audio data to the all-pass filter group 144.

The all-pass filter group 144 includes a plurality of all-pass filters, performs filter processing by the plurality of all-pass filters on the audio data supplied from the comb filter group 143, and supplies the resultant audio data to the addition unit 146.

The addition unit 145 adds the two pieces of audio data supplied from the delay generation unit 142 and supplies the resultant audio data to the addition unit 146.

The addition unit 146 adds the audio data supplied from the all-pass filter group 144 and the audio data supplied from the addition unit 145, and supplies the resultant audio data of the wet component to the 3D audio rendering processing unit 68.

The delay generation unit 147 delays the audio data supplied from the gain control unit 141 by holding the audio data for a certain period of time, and supplies the delayed audio data to the comb filter group 148.

Furthermore, the delay generation unit 147 supplies, to the addition unit 150, two pieces of audio data which are obtained by delaying the audio data supplied from the gain control unit 141, have different delay amounts from the audio data supplied to the comb filter group 148, and have different delay amounts from each other.

The comb filter group 148 includes a plurality of comb filters, performs filter processing by the plurality of comb filters on the audio data supplied from the delay generation unit 147, and supplies the resultant audio data to the all-pass filter group 149.

The all-pass filter group 149 includes a plurality of all-pass filters, performs filter processing by the plurality of all-pass filters on the audio data supplied from the comb filter group 148, and supplies the resultant audio data to the addition unit 151.

The addition unit 150 adds the two pieces of audio data supplied from the delay generation unit 147 and supplies the resultant audio data to the addition unit 151.

The addition unit 151 adds the audio data supplied from the all-pass filter group 149 and the audio data supplied from the addition unit 150, and supplies the resultant audio data of the wet component to the 3D audio rendering processing unit 68.

Note that, although the example in which the stereo (two) wet components are generated for one object has been described here, one wet component may be generated for one object, or three or more wet components may be generated. Furthermore, the configuration of the reverb processing unit 104 is not limited to the configuration illustrated in FIG. 4, and may be any other configuration.

<Regarding Control Rule of Parameter>

As described above, in each processing block configuring the sense-of-distance control processing unit 67, the parameters used for the processing in the processing blocks, that is, the characteristics of the processing change according to the distance from the listening position to the object.

Here, an example of the parameter corresponding to the distance from the listening position to the object, that is, an example of a control rule of the parameter will be described.

For example, the gain control unit 101 determines the gain value used for the gain control processing as the parameter corresponding to the distance from the listening position to the object.

Figure 5:
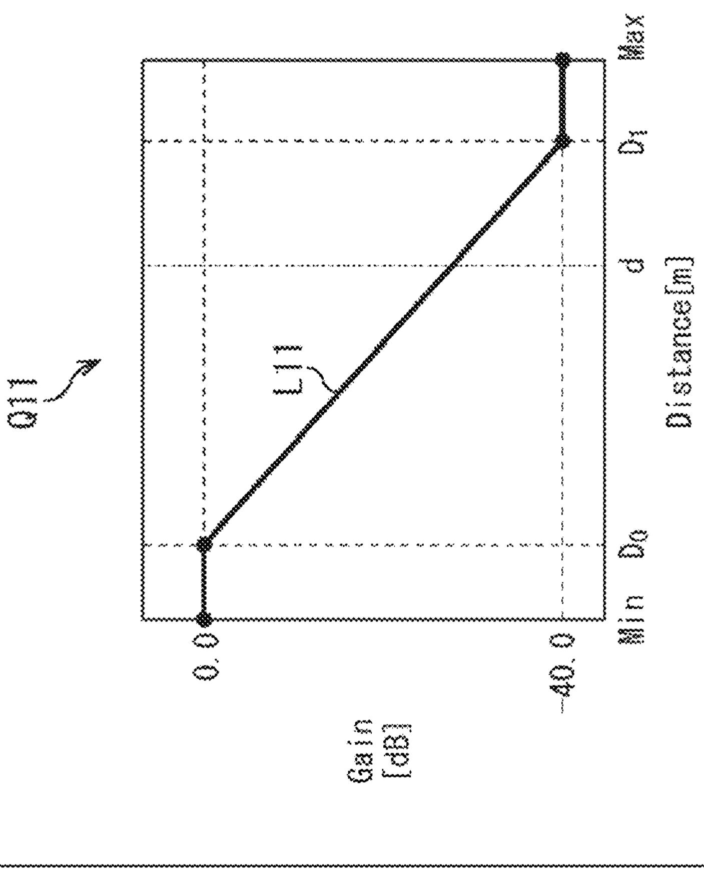
FIG. 5 is a diagram for describing an example of a control rule of gain control processing.

In this case, the gain value changes according to the distance from the listening position to the object as illustrated in FIG. 5, for example.

For example, a portion indicated by an arrow Q11 indicates a change in the gain value corresponding to the distance. That is, a vertical axis represents the gain value as a parameter, and a horizontal axis represents the distance from the listening position to the object.

As indicated by a polygonal line L11, the gain value is 0.0 dB when a distance d from the listening position to the object is between a predetermined minimum value Min and $D_0$, and when the distance d is between $D_0$ and $D_1$, the gain value linearly decreases as the distance d increases. Furthermore, the gain value is −40.0 dB when the distance d is between $D_1$ and the predetermined maximum value Max.

From this, in the example illustrated in FIG. 5, it can be seen that control is performed in which the gain of the audio data is suppressed as the distance d increases.

As a specific example, for example, in a case where the distance d is 1 m (=$D_0$) or less, the gain value is set to 0.0 dB, and when the distance d is between 1 m and 100 m (=$D_1$), the gain value can be linearly changed to −40.0 dB as the distance d increases.

Here, when a point at which the parameter changes is referred to as a control change point, in the example of FIG. 5, a point (position) at which the distance d=$D_0$ and a point at which the distance d=$D_1$ in the polygonal line L11 are control change points.

In this case, for example, as indicated by an arrow Q12, when the gain value "0.0" at the distance d=$D_0$ and the gain value "−40.0" at the distance d=$D_1$ corresponding to the control change point are transmitted to the decoding device 51, the decoding device 51 can obtain the gain value at an arbitrary distance d.

Figure 6:
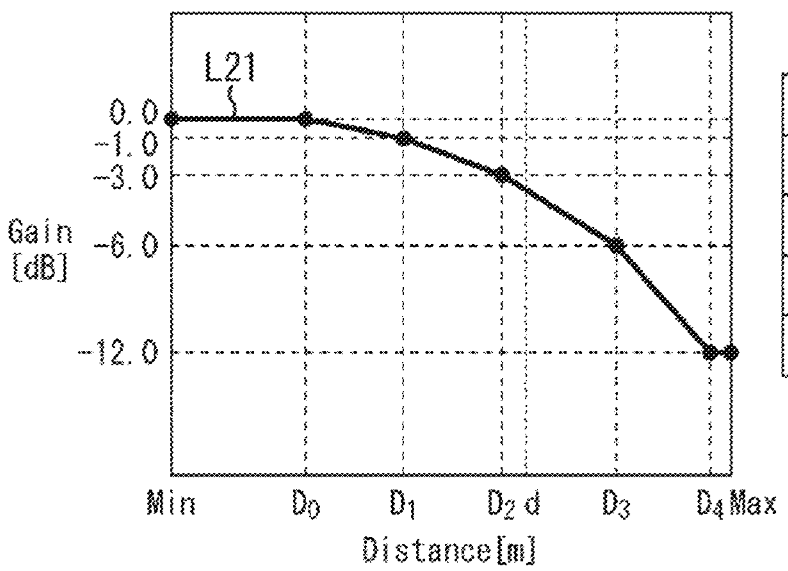
FIG. 6 is a diagram for describing an example of a control rule of filter processing by a high-shelf filter.

Furthermore, in the high-shelf filter processing unit 102, for example, as indicated by an arrow Q21 in FIG. 6, the filter processing is performed in which the gain in the high frequency band is suppressed as the distance d from the listening position to the object increases.

Note that, in the portion indicated by the arrow Q21, the vertical axis represents the gain value as a parameter, and the horizontal axis represents the distance d from the listening position to the object.

In particular, in this example, the high-shelf filter realized by the high-shelf filter processing unit 102 is determined by a cutoff frequency Fc, a Q value indicating a sharpness, and a gain value at the cutoff frequency Fc.

In other words, in the high-shelf filter processing unit 102, the filter processing is performed by the high-shelf filter determined by the cutoff frequency Fc, the Q value, and the gain value which are parameters.

A polygonal line L21 in the portion indicated by the arrow Q21 indicates the gain value at the cutoff frequency Fc determined with respect to the distance d.

In this example, the gain value is 0.0 dB when the distance d is between the minimum value Min and $D_0$, and when the distance d is between $D_0$ and $D_1$, the gain value linearly decreases as the distance d increases.

Furthermore, when the distance d is between $D_1$ and $D_2$, the gain value linearly decreases as the distance d increases, and similarly, when the distance d is between $D_2$ and $D_3$ and the distance d is between $D_3$ and $D_4$, the gain value linearly decreases as the distance d increases. Moreover, the gain value is −12.0 dB when the distance d is between $D_4$ and the maximum value Max.

From this, in the example illustrated in FIG. 6, it can be seen that control is performed in which the gain of the frequency component near the cutoff frequency Fc in the audio data is suppressed as the distance d increases.

As a specific example, for example, in a case where the distance d is 1 m (=$D_0$) or less, a frequency component of 6 kHz, which is the cutoff frequency Fc, or more can be set to pass through, and in a case where the distance d is between the distance d of 1 m and 100 m (=$D_4$), the frequency component of 6 kHz or more can be changed to −12.0 dB as the distance d increases.

Furthermore, in order to realize such a high-shelf filter in the decoding device 51, for example, as indicated by an arrow Q22, the cutoff frequency Fc, the Q value, and the gain value which are parameters are only required to be transmitted only for five control change points of the distances d=$D_0$, $D_1$, $D_2$, $D_3$, and $D_4$.

Note that, here, an example is described in which the cutoff frequency Fc is 6 kHz and the Q value is 2.0 regardless of the distance d, but these cutoff frequency Fc and Q value may also change according to the distance d.

Figure 7:
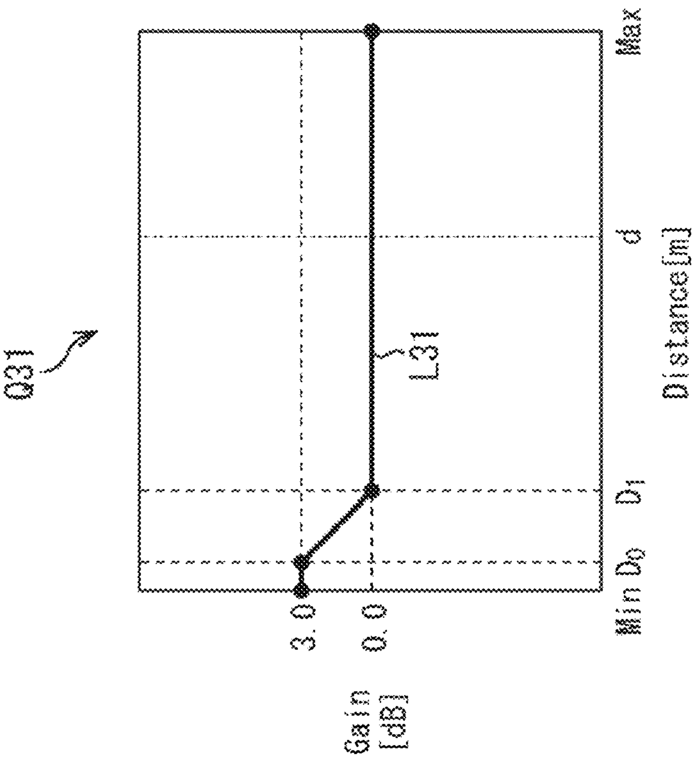
FIG. 7 is a diagram for describing an example of a control rule of filter processing by a low-shelf filter.

Moreover, in the low-shelf filter processing unit 103, for example, as indicated by an arrow Q31 in FIG. 7, the filter processing is performed in which the low-frequency gain is amplified as the distance d from the listening position to the object decreases.

Note that, in the portion indicated by the arrow Q31, the vertical axis represents the gain value as a parameter, and the horizontal axis represents the distance d from the listening position to the object.

In particular, in this example, the low-shelf filter realized by the low-shelf filter processing unit 103 is determined by the cutoff frequency Fc, the Q value indicating the sharpness, and the gain value at the cutoff frequency Fc.

In other words, in the low-shelf filter processing unit 103, the filter processing is performed by the low-shelf filter determined by the cutoff frequency Fc, the Q value, and the gain value which are parameters.

A polygonal line L31 in the portion indicated by the arrow Q31 indicates the gain value at the cutoff frequency Fc determined with respect to the distance d.

In this example, the gain value is 3.0 dB when the distance d is between the minimum value Min and $D_0$, and when the distance d is between $D_0$ and $D_1$, the gain value linearly decreases as the distance d increases. Furthermore, the gain value is 0.0 dB when the distance d is between $D_1$ and the maximum value Max.

From this, in the example illustrated in FIG. 7, it can be seen that control is performed in which the gain of the frequency component near the cutoff frequency Fc in the audio data is amplified as the distance d decreases.

As a specific example, for example, in a case where the distance d is 3 m (=$D_1$) or more, a frequency component of 200 Hz, which is the cutoff frequency Fc, or less can be set to pass through, and in a case where the distance d is between 3 m and 10 cm (=$D_0$), the frequency component of 200 Hz or less can be changed to +3.0 dB as the distance d decreases.

Furthermore, in order to realize such a low-shelf filter in the decoding device 51, for example, as indicated by an arrow Q32, the cutoff frequency Fc, the Q value, and the gain value which are parameters are only required to be transmitted only for two control change points of the distances $d=D_0$ and $D_1$.

Note that, here, an example is described in which the cutoff frequency Fc is 200 Hz and the Q value is 2.0 regardless of the distance d, but these cutoff frequency Fc and Q value may also change according to the distance d.

Figure 8:
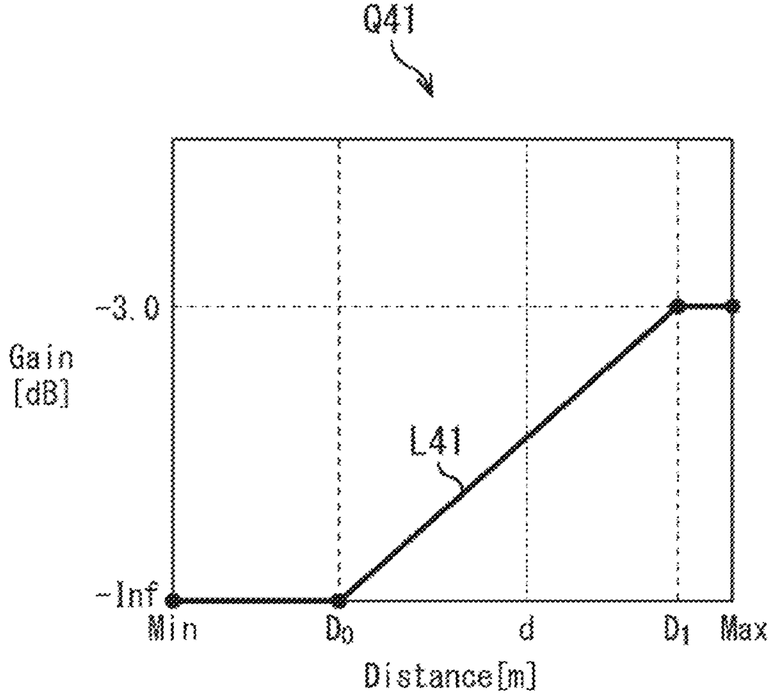
FIG. 8 is a diagram for describing an example of a control rule of reverb processing.

Moreover, in the reverb processing unit 104, for example, as indicated by an arrow Q41 in FIG. 8, the reverb processing is performed in which the gain (wet gain value) of the wet component increases as the distance d from the listening position to the object increases.

In other words, control is performed in which the proportion of the wet component (reverberation component) generated by the reverb processing to the dry component increases as the distance d increases. Note that the wet gain value here is, for example, a gain value used in gain control in the gain control unit 141 illustrated in FIG. 4.

In the portion indicated by the arrow Q41, the vertical axis represents the wet gain value as a parameter, and the horizontal axis represents the distance d from the listening position to the object. Furthermore, a polygonal line L41 indicates the wet gain value determined for the distance d.

As indicated by the polygonal line L41, the wet gain value is negative infinity (−InfdB) when the distance d from the listening position to the object is between the minimum value Min and $D_0$, and when the distance d is between $D_0$ and $D_1$, the wet gain value linearly increases as the distance d increases. Furthermore, the wet gain value is −3.0 dB when the distance d is between $D_1$ and the maximum value Max.

From this, in the example shown in FIG. 8, it can be seen that control is performed in which the wet component increases as the distance d increases.

As a specific example, for example, in a case where the distance d is 1 m ($=D_0$) or less, the gain (wet gain value) of the wet component is set to −InfdB, and in a case where the distance d is between the distance d of 1 m and 50 m ($=D_1$), the gain can be linearly changed to −3.0 dB as the distance d increases.

Moreover, in order to realize such reverb processing in the decoding device 51, for example, as indicated by an arrow Q42, the wet gain value as a parameter is only required to transmitted only for two control change points of the distances $d=D_0$ and $D_1$.

Furthermore, in the reverb processing, audio data of an arbitrary number of wet components (reverberation components) can be generated.

Figure 9:
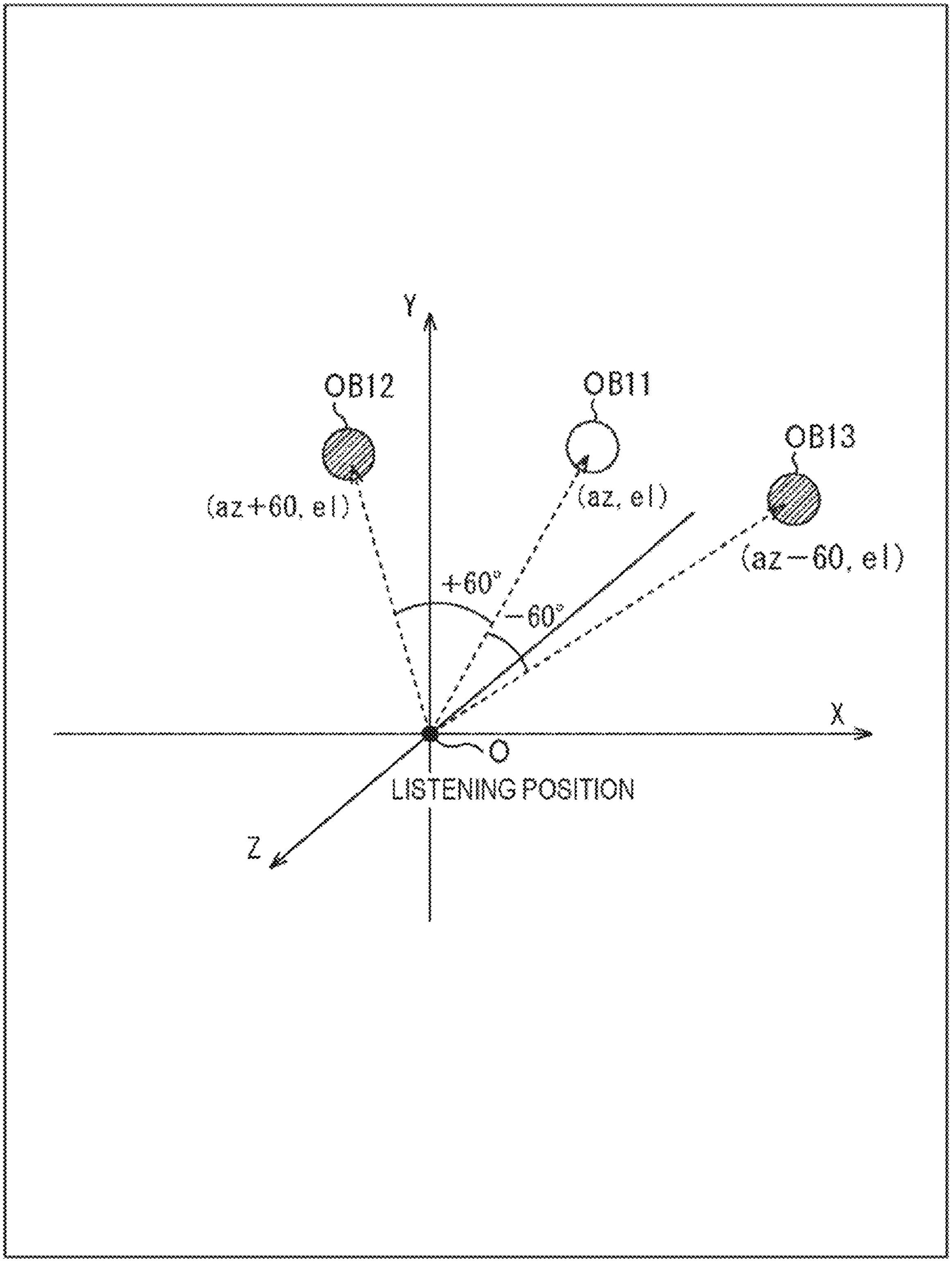
FIG. 9 is a diagram for describing generation of a wet component.

Specifically, for example, as illustrated in FIG. 9, audio data of a stereo reverberation component can be generated for audio data of one object, that is, mono audio data.

In this example, an origin O of the XYZ coordinate system, which is a three-dimensional orthogonal coordinate system in the reproduction space, is the listening position, and one object OB11 is arranged in the reproduction space.

Now, the position of an arbitrary object in the reproduction space is represented by a horizontal angle indicating the position in the horizontal direction viewed from the origin O and a vertical angle indicating the position in the vertical direction viewed from the origin O, and the position of the object OB11 is represented as (az, el) from a horizontal angle az and a vertical angle el.

Note that when a straight line connecting the origin O and the object OB11 is LN and a straight line obtained by projecting the straight line LN on the XZ plane is LN', the horizontal angle az is an angle formed by the straight line LN' and the Z axis. Furthermore, the vertical angle el is an angle formed by the straight line LN and the XZ plane.

In the example of FIG. 9, for the object OB11, two objects OB12 and object OB13 are generated as wet component objects.

In particular, here, the object OB12 and the object OB13 are arranged at bilaterally symmetrical positions with respect to the object OB11 when viewed from the origin O.

That is, the object OB12 and the object OB13 are arranged at positions shifted by 60 degrees to the left and right relatively from the object OB11, respectively.

Therefore, the position of the object OB12 is a position (az+60, el) represented by the horizontal angle (az+60) and the vertical angle el, and the position of the object OB13 is a position (az−60, el) represented by the horizontal angle (az−60) and the vertical angle el.

As described above, in a case where the wet components at bilaterally symmetrical positions with respect to the object OB11 are generated, the positions of the wet components can be designated by an offset angle with respect to the position of the object OB11. For example, in this example, an offset angle of ±60 degrees of the horizontal angle is only required to be designated.

Note that, although an example of generating two right and left wet components positioned on the right side and the left side with respect to one object has been described here, the number of wet components generated for one object may be any number, and for example, wet components at upper, lower, left, and right positions may be generated.

Figure 10:
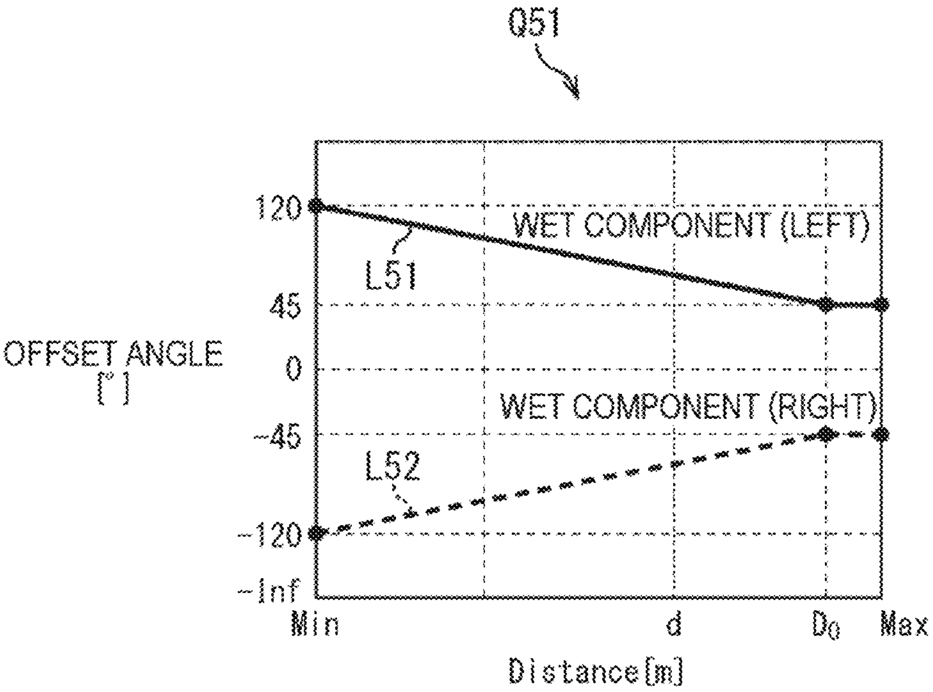
FIG. 10 is a diagram for describing the generation of the wet component.

Furthermore, for example, in a case where bilaterally symmetrical wet components are generated as illustrated in FIG. 9, the offset angle for designating the positions of the wet components may change according to the distance from the listening position to the object as illustrated in FIG. 10.

In a portion indicated by an arrow Q51 in FIG. 10, the offset angle of the horizontal angle between the object OB12 and the object OB13 which are the wet components illustrated in FIG. 9 is illustrated.

That is, in the portion indicated by the arrow Q51, the vertical axis represents the offset angle of the horizontal angle, and the horizontal axis represents the distance d from the listening position to the object OB11.

Furthermore, a polygonal line L51 indicates the offset angle of the object OB12 which is the left wet component determined for each distance d. In this example, as the distance d decreases, the offset angle increases, and the object OB12 is arranged at a position farther away from the original object OB11.

On the other hand, a polygonal line L52 indicates the offset angle of the object OB13 which is the right wet component determined for each distance d. In this example, as the distance d decreases, the offset angle decreases, and the object OB13 is arranged at a position farther away from the original object OB11.

In a case where the offset angle changes according to the distance d in this manner, for example, as indicated by an arrow Q52, when the offset angle is transmitted to the decoding device 51 only for the control change point of the distance $d=D_0$, the wet component can be generated at the position intended by the content creator.

As described above, when the sense-of-distance control processing is performed with the configuration and the parameter corresponding to the distance d from the listening position to the object, the sense of distance can be appropriately reproduced. That is, it is possible to cause the listener to feel a sense of distance to the object.

At this time, when the content creator freely determines the parameter at each distance d, the sense-of-distance control based on the intention of the content creator can be realized.

Note that the control rule of the parameter corresponding to the distance d described above is merely an example, and by allowing the content creator to freely designate the control rule, it is possible to change how to feel the sense of distance to the object.

For example, since the change in sound with respect to the distance is different between outdoor and indoor, it is necessary to change the control rule depending on whether the space to be reproduced is outdoor or indoor.

Therefore, for example, by determining (designating) the control rule according to the space where the content creator desires to reproduce with the content, the sense-of-distance control based on the intention of the content creator can be realized, and content reproduction with higher realistic feeling can be performed.

Furthermore, in the sense-of-distance control processing unit 67, the parameter used for the sense-of-distance control processing can be further adjusted according to the reproduction environment of the content (reproduction audio data).

Specifically, for example, the gain of the wet component used in the reverb processing, that is, the above-described wet gain value can be adjusted according to the reproduction environment of the content.

When content is actually reproduced by a speaker or the like in the real space, reverberation of sound output from the speaker or the like occurs in the real space. At this time, how much reverberation occurs depends on the real space where the content is reproduced, that is, the reproduction environment.

For example, when the content is reproduced in a highly reverberant environment, reverberation is further added to the sound of the reproduced content. Therefore, in a case where the content is actually reproduced, there is a case where the listener feels the sense of distance realized by the sense-of-distance control processing, that is, the sense of distance farther than the sense of distance intended by the content creator.

Therefore, in a case where the reverberation in the reproduction environment is small, the sense-of-distance control processing is performed according to a preset control rule, that is, the control rule information, but in a case where the reverberation in the reproduction environment is relatively large, fine adjustment of the wet gain value determined according to the control rule may be performed.

Specifically, for example, it is assumed that the user or the like operates the user interface 65 and inputs information regarding the reverberation of the reproduction environment such as type information, such as outdoors or indoors, of the reproduction environment and information indicating whether or not the reproduction environment is highly reverberant. In such a case, the user interface 65 supplies the information regarding reverberation of the reproduction environment input by the user or the like to the sense-of-distance control processing unit 67.

Then, the sense-of-distance control processing unit 67 calculates the wet gain value on the basis of the control rule information, the distance information, and the information regarding the reverberation of the reproduction environment supplied from the user interface 65.

Specifically, the sense-of-distance control processing unit 67 calculates the wet gain value on the basis of the control rule information and the distance information, and performs determination processing on whether or not the reproduction environment is highly reverberant on the basis of the information regarding the reverberation of the reproduction environment.

Here, for example, in a case where the information indicating that the reproduction environment is highly reverberant or the type information indicating a highly reverberant reproduction environment is supplied as the information regarding the reverberation of the reproduction environment, it is determined that the reproduction environment is highly reverberant.

Then, in a case where it is determined that the reproduction environment is not highly reverberant, that is, the reproduction environment is less reverberant, the sense-of-distance control processing unit 67 supplies the calculated wet gain value to the reverb processing unit 104 as a final wet gain value.

On the other hand, in a case where it is determined that the reproduction environment is highly reverberant, the sense-of-distance control processing unit 67 corrects (adjusts) the calculated wet gain value with a predetermined correction value such as −6 dB, and supplies the corrected wet gain value to the reverb processing unit 104 as the final wet gain value.

Note that the wet gain value correction value may be a predetermined value, or may be calculated by the sense-of-distance control processing unit 67 on the basis of the information regarding the reverberation of the reproduction environment, that is, the degree of reverberation in the reproduction environment.

By adjusting the wet gain value according to the reproduction environment in this manner, it is possible to improve a deviation from the sense of distance intended by the content creator, the deviation being caused by the reproduction environment of the content.

<Transmission of Sense-of-Distance Control Information>

Next, a transmission method of the sense-of-distance control information described above will be described.

The sense-of-distance control information encoded by the sense-of-distance control information encoding unit 24 can have a configuration illustrated in FIG. 11, for example.

In FIG. 11, "DistanceRender_Attn( )" indicates parameter configuration information indicating the control rule of the parameters used in the gain control unit 101.

Furthermore, "DistanceRender_Filt( )" indicates parameter configuration information indicating the control rule of the parameters used in the high-shelf filter processing unit 102 or the low-shelf filter processing unit 103.

Here, since the high-shelf filter and the low-shelf filter can be expressed by the same parameter configuration, the high-shelf filter and the low-shelf filter are described by the same syntax of the parameter configuration information DistanceRender_Filt( ). Therefore, the sense-of-distance control information includes the parameter configuration information DistanceRender_Filt( ) of the high-shelf filter processing unit 102 and the parameter configuration information DistanceRender_Filt( ) of the low-shelf filter processing unit 103.

Moreover, "DistanceRender_Revb( )" indicates parameter configuration information indicating the control rule of the parameter used in the reverb processing unit 104.

The parameter configuration information DistanceRender_Attn( ), the parameter configuration information DistanceRender_Filt( ), and the parameter configuration information DistanceRender_Revb( ) included in the sense-of-distance control information correspond to the control rule information.

Furthermore, in the sense-of-distance control information illustrated in FIG. 11, parameter configuration information of four processing steps configuring the sense-of-distance control processing is arranged and stored in the order in which the processing steps are performed.

Therefore, in the decoding device 51, the configuration of the sense-of-distance control processing unit 67 illustrated in FIG. 3 can be specified on the basis of the sense-of-distance control information. In other words, from the sense-of-distance control information illustrated in FIG. 11, it is possible to specify how many processing steps are included in the sense-of-distance control processing, what processing are performed in those processing steps, and in what order the processing is performed. Therefore, in this example, it can be said that the sense-of-distance control information substantially includes the configuration information.

Moreover, the parameter configuration information DistanceRender_Attn( ), the parameter configuration information DistanceRender_Filt( ), and the parameter configuration information DistanceRender_Revb( ) illustrated in FIG. 11 are configured as illustrated in FIGS. 12 to 14, for example.

FIG. 12 is a diagram illustrating a configuration example, that is, a syntax example, of the parameter configuration information DistanceRender_Attn( ) of the gain control processing.

In FIG. 12, "num_points" indicates the number of control change points of the parameter of the gain control processing. For example, in the example illustrated in FIG. 5, a point (position) at which the distance $d=D_0$ and a point at which the distance $d=D_1$ are control change points.

In the example of FIG. 12, "distance[i]" indicating the distances d corresponding to the control change points and gain values "gain[i]" as a parameter at the distances d are included as many as the number of the control change points. When the distance distance[i] and the gain value gain[i] of each control change point is transmitted in this manner, the gain control illustrated in FIG. 5 can be realized in the decoding device 51.

FIG. 13 is a diagram illustrating a configuration example, that is, a syntax example, of the parameter configuration information DistanceRender_Filt( ) of the filter processing.

In FIG. 13, "filt_type" indicates an index indicating a filter type.

For example, an index filt_type "0" indicates a low-shelf filter, an index filt_type "1" indicates a high-shelf filter, and an index filt_type "2" indicates a peak filter.

Furthermore, an index filt_type "3" indicates a low-pass filter, and an index filt_type "4" indicates a high-pass filter.

Therefore, for example, when the value of the index filt_type is "0", it can be seen that the parameter configuration information DistanceRender_Filt( ) includes information regarding a parameter for specifying the configuration of the low-shelf filter.

Note that, in the example illustrated in FIG. 3, the high-shelf filter and the low-shelf filter have been described as filter examples of the filter processing configuring the sense-of-distance control processing.

On the other hand, in the example illustrated in FIG. 13, the peak filter, the low-pass filter, the high-pass filter, and the like can also be used.

Note that, as the filter for the filter processing configuring the sense-of-distance control processing, only some of the low-shelf filter and the high-shelf filter, the peak filter, the low-pass filter, and the high-pass filter may be used, or other filters may be used.

In the parameter configuration information DistanceRender_Filt( ) illustrated in FIG. 13, a region after the index filt_type includes a parameter or the like for specifying the configuration of the filter indicated by the index filt_type.

That is, "num_points" indicates the number of the control change points of the parameter of the filter processing.

Furthermore, "distance[i]" indicating the distances d corresponding to the control change points, frequencies "freq[i]", Q values "Q[i]", and gain values "gain[i]" as parameters at the distances d are included as many as the number of the control change points indicated by the "num_points".

For example, when the index filt_type is "0" indicating a low-shelf filter, the frequency "freq[i]", the Q value "Q[i]", and the gain value "gain[i]", which are parameters, correspond to the cutoff frequency Fc, the Q value, and the gain value illustrated in FIG. 7.

Note that the frequency freq[i] is a cutoff frequency when the filter type is the low-shelf filter and the high-shelf filter, the low-pass filter, or the high-pass filter, but is a center frequency when the filter type is the peak filter.

As described above, when the distance distance[i], the frequency "freq[i]", the Q value "Q[i]", and the gain value "gain[i]" of each control change point are transmitted, the high-shelf filter illustrated in FIG. 6 and the low-shelf filter illustrated in FIG. 7 can be realized in the decoding device 51.

FIG. 14 is a diagram illustrating a configuration example, that is, a syntax example, of the parameter configuration information DistanceRender_Revb( ) of the reverb processing.

In FIG. 14, "num_points" indicates the number of the control change points of the parameter of the reverb processing, and in this example, "distance[i]" indicating the distances d corresponding to those control change points and the wet gain values "wet_gain[i]" as the parameter at the distances d are included as many as the number of the control change points. The wet gain value wet_gain[i] corresponds to, for example, the wet gain value illustrated in FIG. 8.

Furthermore, in FIG. 14, "num_wetobjs" indicates the number of generated wet components, that is, the number of objects of the wet components, and the offset angles indicating the positions of the wet components is stored as many as the number of the wet components.

That is, "wet_azimuth_offset[i][j]" indicates the offset angle of the horizontal angle of a j-th wet component (object) at the distance distance[i] corresponding to an i-th control change point. The offset angle wet_azimuth_offset[i][j] corresponds to, for example, the offset angle of the horizontal angle illustrated in FIG. 10.

Similarly, "wet_elevation_offset[i][j]" indicates the offset angle of the vertical angle of the j-th wet component at the distance distance[i] corresponding to the i-th control change point.

Note that the number num_wetobjs of the generated wet components is determined by the reverb processing to be performed by the decoding device 51, and for example, the number num_wetobjs of the wet components is given from the outside.

As described above, in the example of FIG. 14, the distance distance[i] and the wet gain value wet_gain[i] at each control change point, and the offset angle wet_azimuth_offset[i][j] and the offset angle wet_elevation_offset[i][j] of each wet component are transmitted to the decoding device 51.

Therefore, in the decoding device 51, for example, the reverb processing unit 104 illustrated in FIG. 4 can be realized, and the audio data of the dry component and the audio data and the metadata of each wet component can be obtained.

<Description of Encoding Process>

Next, an operation of the content reproduction system will be described.

First, an encoding process performed by the encoding device 11 will be described with reference to a flowchart in FIG. 15.

In step S11, the object encoding unit 21 encodes the supplied audio data of each object, and supplies the obtained coded audio data to the multiplexer 25.

In step S12, the metadata encoding unit 22 encodes the supplied metadata of each object, and supplies the obtained coded metadata to the multiplexer 25.

In step S13, the sense-of-distance control information determination unit 23 determines the sense-of-distance control information according to a designation operation or the like by the user, and supplies the determined sense-of-distance control information to the sense-of-distance control information encoding unit 24.

In step S14, the sense-of-distance control information encoding unit 24 encodes the sense-of-distance control information supplied from the sense-of-distance control information determination unit 23, and supplies the obtained coded sense-of-distance control information to the multiplexer 25. Therefore, for example, the sense-of-distance control information (coded sense-of-distance control information) illustrated in FIG. 11 is obtained and supplied to the multiplexer 25.

In step S15, the multiplexer 25 multiplexes the coded audio data from the object encoding unit 21, the coded metadata from the metadata encoding unit 22, and the coded sense-of-distance control information from the sense-of-distance control information encoding unit 24 to generate coded data.

In step S16, the multiplexer 25 sends the coded data obtained by the multiplexing to the decoding device 51 via a communication network or the like, and the encoding process ends.

As described above, the encoding device 11 generates coded data including the sense-of-distance control information, and sends the coded data to the decoding device 51.

As described above, by transmitting the sense-of-distance control information in addition to the audio data and the metadata of each object to the decoding device 51, it is possible to realize the sense-of-distance control based on the intention of the content creator on the decoding device 51 side.

<Description of Decoding Process>

Figure 15:
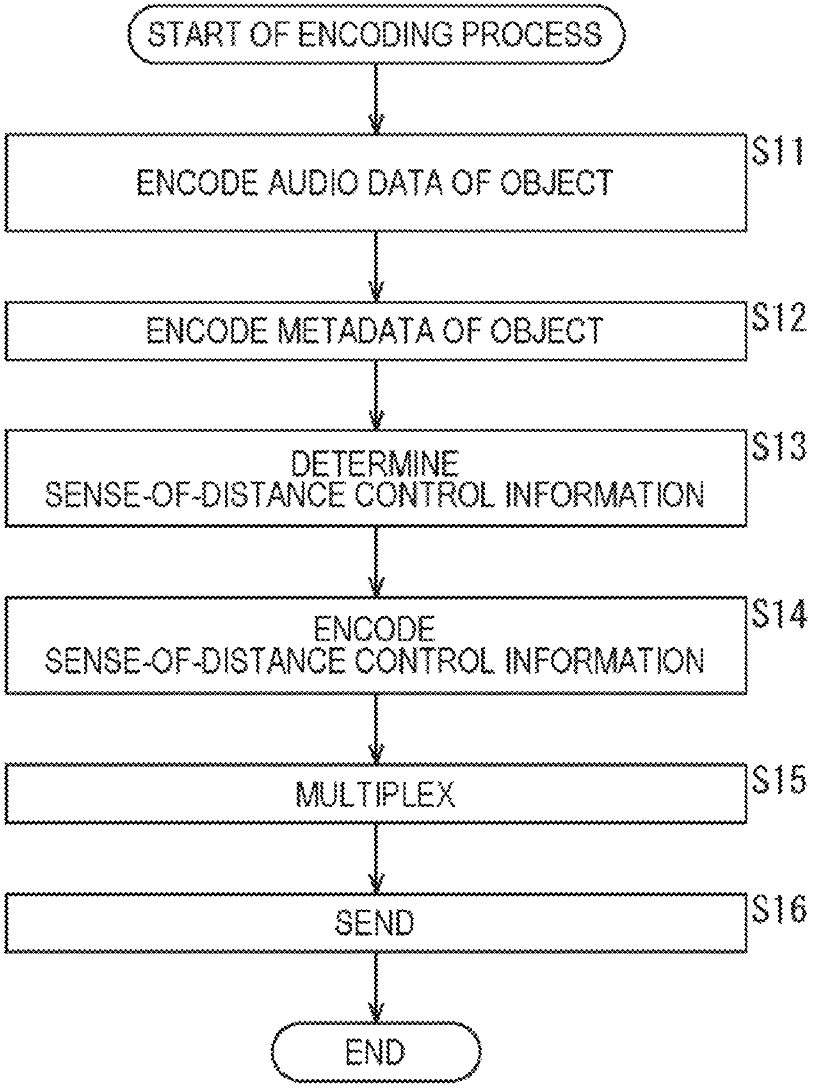
FIG. 15 is a flowchart for describing an encoding process.

Furthermore, when the encoding process described with reference to FIG. 15 is performed in the encoding device 11, a decoding process is performed in the decoding device 51. Hereinafter, the decoding process by the decoding device 51 will be described with reference to a flowchart in FIG. 16.

In step S41, the demultiplexer 61 receives the coded data sent from the encoding device 11.

In step S42, the demultiplexer 61 demultiplexes the received coded data, and extracts the coded audio data, the coded metadata, and the coded sense-of-distance control information from the coded data.

The demultiplexer 61 supplies the coded audio data to the object decoding unit 62, supplies the coded metadata to the metadata decoding unit 63, and supplies the coded sense-of-distance control information to the sense-of-distance control information decoding unit 64.

In step S43, the object decoding unit 62 decodes the coded audio data supplied from the demultiplexer 61, and supplies the obtained audio data to the sense-of-distance control processing unit 67.

In step S44, the metadata decoding unit 63 decodes the coded metadata supplied from the demultiplexer 61, and supplies the obtained metadata to the sense-of-distance control processing unit 67 and the distance calculation unit 66.

In step S45, the sense-of-distance control information decoding unit 64 decodes the coded sense-of-distance control information supplied from the demultiplexer 61, and supplies the obtained sense-of-distance control information to the sense-of-distance control processing unit 67.

In step S46, the distance calculation unit 66 calculates the distance from the listening position to the object on the basis of the metadata supplied from the metadata decoding unit 63 and the listening position information supplied from the user interface 65, and supplies distance information indicating the calculation result to the sense-of-distance control processing unit 67. In step S46, the distance information is obtained for every object.

In step S47, the sense-of-distance control processing unit 67 performs the sense-of-distance control processing on the basis of the audio data supplied from the object decoding unit 62, the metadata supplied from the metadata decoding unit 63, the sense-of-distance control information supplied from the sense-of-distance control information decoding unit 64, the listening position information supplied from the user interface 65, and the distance information supplied from the distance calculation unit 66.

For example, in a case where the sense-of-distance control processing unit 67 has the configuration illustrated in FIG. 3 and the sense-of-distance control information illustrated in FIG. 11 is supplied, the sense-of-distance control processing unit 67 calculates the parameters used in each processing step on the basis of the sense-of-distance control information and the distance information.

Specifically, for example, the sense-of-distance control processing unit 67 obtains a gain value at the distance d indicated by the distance information on the basis of the distance distance[i] and the gain value gain[i] of each control change point, and supplies the gain value to the gain control unit 101.

Furthermore, on the basis of the distance distance[i], the frequency freq[i], the Q value Q[i], and the gain value gain[i] of each control change point of the high-shelf filter, the sense-of-distance control processing unit 67 obtains the cutoff frequency, the Q value, and the gain value at the distance d indicated by the distance information, and supplies them to the high-shelf filter processing unit 102.

Therefore, the high-shelf filter processing unit 102 can construct the high-shelf filter corresponding to the distance d indicated by the distance information.

Similarly to the case of the high-shelf filter, the sense-of-distance control processing unit 67 obtains the cutoff frequency, the Q value, and the gain value of the low-shelf filter at the distance d indicated by the distance information, and supplies them to the low-shelf filter processing unit 103. Therefore, the low-shelf filter processing unit 103 can construct the low-shelf filter corresponding to the distance d indicated by the distance information.

Moreover, the sense-of-distance control processing unit 67 obtains a wet gain value at the distance d indicated by the distance information on the basis of the distance distance[i]

and the wet gain value wet_gain[i] of each control change point, and supplies the wet gain value to the reverb processing unit 104.

Therefore, the sense-of-distance control processing unit 67 illustrated in FIG. 3 is constructed from the sense-of-distance control information.

Furthermore, the sense-of-distance control processing unit 67 supplies the offset angle wet_azimuth_offset[i][j] of the horizontal angle and the offset angle wet_elevation_offset[i][j] of the vertical angle, the metadata of the object, and the listening position information to the reverb processing unit 104.

The gain control unit 101 performs gain control processing on the audio data of the object on the basis of the gain value supplied from the sense-of-distance control processing unit 67, and supplies the resultant audio data to the high-shelf filter processing unit 102.

The high-shelf filter processing unit 102 performs filter processing on the audio data supplied from the gain control unit 101 by the high-shelf filter determined by the cutoff frequency, the Q value, and the gain value supplied from the sense-of-distance control processing unit 67, and supplies the resultant audio data to the low-shelf filter processing unit 103.

The low-shelf filter processing unit 103 performs filter processing on the audio data supplied from the high-shelf filter processing unit 102 by the low-shelf filter determined by the cutoff frequency, the Q value, and the gain value supplied from the sense-of-distance control processing unit 67.

The sense-of-distance control processing unit 67 supplies, to the 3D audio rendering processing unit 68, the audio data obtained by the filter processing in the low-shelf filter processing unit 103 as the audio data of the dry component together with the metadata of the object of the dry component. The metadata of the dry component is the metadata supplied from the metadata decoding unit 63.

Furthermore, the low-shelf filter processing unit 103 supplies the audio data obtained by the filter processing to the reverb processing unit 104.

Then, for example, as described with reference to FIG. 4, the reverb processing unit 104 performs gain control based on the wet gain value for the audio data of the dry component, delay processing on the audio data, filter processing using a comb filter and an all-pass filter, and the like, and generates the audio data of the wet component.

Furthermore, the reverb processing unit 104 calculates the position information of the wet component on the basis of the offset angle wet_azimuth_offset[i][j] and the offset angle wet_elevation_offset[i][j], the metadata of the object (dry component), and the listening position information, and generates the metadata of the wet component including the position information.

The reverb processing unit 104 supplies the audio data and metadata of each wet component generated in this manner to the 3D audio rendering processing unit 68.

In step S48, the 3D audio rendering processing unit 68 performs rendering processing on the basis of the audio data and the metadata supplied from the sense-of-distance control processing unit 67 and the listening position information supplied from the user interface 65, and generates reproduction audio data. For example, in step S48, VBAP or the like is performed as the rendering processing.

When the reproduction audio data is generated, the 3D audio rendering processing unit 68 outputs the generated reproduction audio data to the subsequent stage, and the decoding process ends.

As described above, the decoding device 51 performs the sense-of-distance control processing on the basis of the sense-of-distance control information included in the coded data, and generates the reproduction audio data. In this way, it is possible to realize the sense-of-distance control based on the intention of the content creator.

First Modification of First Embodiment

<Another Example of Parameter Configuration Information>

Note that, although the examples illustrated in FIGS. 12, 13, and 14 have been described above as the parameter configuration information, the parameter configuration information is not limited thereto, and any parameter configuration information may be used as long as the parameter of the sense-of-distance control processing can be obtained.

For example, it is also conceivable to prepare in advance a table, a function (mathematical expression), or the like for obtaining a parameter for the distance d from the listening position to the object for each of one or more processing steps configuring the sense-of-distance control processing, and include an index indicating the table or the function in the parameter configuration information. In this case, the index indicating the table or the function is the control rule information indicating the control rule of the parameter.

In a case where the index indicating the table or the function for obtaining the parameter is set as the control rule information in this manner, for example, as illustrated in FIG. 17, a plurality of tables and functions for obtaining the gain value of the gain control processing as the parameter can be prepared.

In this example, for example, a function "$20 \log 10(1/d)^2$" for obtaining the gain value of the gain control processing is prepared for the index value "1", and the gain value of the gain control processing corresponding to the distance d can be obtained by substituting the distance d into this function.

Furthermore, for example, a table for obtaining the gain value of the gain control processing is prepared for the index value "2", and when this table is used, the gain value as the parameter decreases as the distance d increases.

The sense-of-distance control processing unit 67 of the decoding device 51 holds the table or the function in advance in association with such each index.

In such a case, for example, the parameter configuration information DistanceRender_Attn( ) illustrated in FIG. 11 has the configuration illustrated in FIG. 18.

In the example of FIG. 18, the parameter configuration information DistanceRender_Attn( ) includes the index "index" indicating the function or table designated by the content creator.

Therefore, the sense-of-distance control processing unit 67 reads the table or the function held in association with the index "index", and obtains a gain value as the parameter on the basis of the read table or function and the distance d from the listening position to the object.

In this way, when a plurality of patterns, that is, a plurality of tables or functions for obtaining the parameter corresponding to the distance d is defined in advance, the content creator can designate (select) a desired pattern from among these patterns, thereby performing the sense-of-distance control processing according to his/her intention.

Note that, here, an example has been described in which the table or the function for obtaining the parameter of the gain control processing is designated by the index. However, the present invention is not limited thereto, and also in the case of the filter processing of the high-shelf filter and the like or the reverb processing, the control rule of the parameter can be designated by the index in the similar manner.

Second Modification of First Embodiment

<Another Example of Sense-of-Distance Control Information>

Furthermore, in the above description, an example has been described in which the parameter corresponding to the distance d is determined with the same control rule for all objects. However, the control rule of the parameter may be set (designated) for every object.

In such a case, the sense-of-distance control information is configured as illustrated in FIG. 19, for example.

In the example illustrated in FIG. 19, “num_objs” indicates the number of objects included in the content, and for example, the number num_objs of objects is given to the sense-of-distance control information determination unit 23 from the outside.

In the sense-of-distance control information, flags “isDistanceRenderFlg” indicating whether or not an object is the target of the sense-of-distance control are included as many as the number num_objs of the objects.

For example, in a case where the value of the flag isDistanceRenderFlg of the i-th object is “1”, the object is determined to be the target of the sense-of-distance control, and the sense-of-distance control processing is performed on the audio data of the object.

In a case where the value of the flag isDistanceRenderFlg of the i-th object is “1”, the sense-of-distance control information includes the parameter configuration information DistanceRender_Attn( ), two pieces of parameter configuration information DistanceRender_Filt( ), and the parameter configuration information DistanceRender_Revb( ) of the object.

Therefore, in this case, as described above, the sense-of-distance control processing unit 67 performs the sense-of-distance control processing on the audio data of the target object, and outputs the obtained audio data and metadata of the dry component and the wet component.

On the other hand, in a case where the value of the flag isDistanceRenderFlg of the i-th object is “0”, it is determined that the object is not the target of the sense-of-distance control, that is, is nontarget, and the sense-of-distance control processing is not performed on the audio data of the object.

Therefore, for such an object, the audio data and metadata of the object are supplied without change from the sense-of-distance control processing unit 67 to the 3D audio rendering processing unit 68.

In a case where the value of the flag isDistanceRenderFlg of the i-th object is “0”, the sense-of-distance control information does not include the parameter configuration information DistanceRender_Attn( ), the parameter configuration information DistanceRender_Filt( ), and the parameter configuration information DistanceRender_Revb( ) of the object.

As described above, in the example illustrated in FIG. 19, the sense-of-distance control information encoding unit 24 encodes the parameter configuration information for every object. In other words, the sense-of-distance control information is encoded for every object. Therefore, the sense-of-distance control based on the intention of the content creator can be realized for every object, and content reproduction with higher realistic feeling can be performed.

In particular, in this example, when the flag isDistanceRenderFlg is stored in the sense-of-distance control information, it is possible to set whether or not to perform the sense-of-distance control for every object and then perform different sense-of-distance control for every object.

For example, with respect to an object of human voice, by setting a control rule different from that of other objects other than the object or by not performing the sense-of-distance control itself, it is possible to cause the listener to feel less sense of distance, that is, to reproduce a sound that is always easy for the listener to hear (a sound that is easy to hear).

Third Modification of First Embodiment

<Another Example of Sense-of-Distance Control Information>

Furthermore, the control rule of the parameter may be set (designated) not for every object but for every object group including one or more objects.

In such a case, the sense-of-distance control information is configured as illustrated in FIG. 20, for example.

In the example illustrated in FIG. 20, “num_obj_groups” indicates the number of object groups included in the content, and for example, the number num_obj_groups of object groups is given to the sense-of-distance control information determination unit 23 from the outside.

In the sense-of-distance control information, flags “isDistanceRenderFlg” indicating whether or not an object group, more specifically, an object belonging to the object group is the target of the distance sense control are included as many as the number num_obj_groups of the object group.

For example, in a case where the value of the flag isDistanceRenderFlg of the i-th object group is “1”, the object group is determined to be the target of the sense-of-distance control, and the sense-of-distance control processing is performed on the audio data of the object belonging to the object group.

In a case where the value of the flag isDistanceRenderFlg of the i-th object group is “1”, the sense-of-distance control information includes the parameter configuration information DistanceRender_Attn( ), two pieces of parameter configuration information DistanceRender_Filt( ), and the parameter configuration information DistanceRender_Revb( ) of the object group.

Therefore, in this case, as described above, the sense-of-distance control processing unit 67 performs the sense-of-distance control processing on the audio data of the object belonging to the target object group.

On the other hand, in a case where the value of the flag isDistanceRenderFlg of the i-th object group is “0”, the object group is determined not to be the target of the sense-of-distance control, and the sense-of-distance control processing is not performed on the audio data of the object of the object group.

Therefore, for the object of such an object group, the audio data and metadata of the object are without change supplied from the sense-of-distance control processing unit 67 to the 3D audio rendering processing unit 68.

In a case where the value of the flag isDistanceRenderFlg of the i-th object group is “0”, the sense-of-distance control information does not include the parameter configuration information DistanceRender_Attn( ), the parameter configuration information DistanceRender_Filt( ), and the parameter configuration information DistanceRender_Revb( ) of the object group.

As described above, in the example illustrated in FIG. 20, the sense-of-distance control information encoding unit 24 encodes the parameter configuration information for every object group. In other words, the sense-of-distance control information is encoded for every object group. Therefore, the sense-of-distance control based on the intention of the content creator can be realized for every object group, and content reproduction with higher realistic feeling can be performed.

In particular, in this example, when the flag isDistanceRenderFlg is stored in the sense-of-distance control information, it is possible to set whether or not to perform the sense-of-distance control for every object group and then perform different sense-of-distance control for every object group.

For example, in a case where the same control rule is set for a plurality of percussive instruments such as a snare drum, a bass drum, a tom-tom, and a cymbal which configure a drum set, the content creator can group the objects of the plurality of percussive instruments together into one object group.

In this way, the same control rule can be set for each object corresponding to each of the plurality of percussive instruments belonging to the same object group and configuring the drum set. That is, the same control rule information can be assigned to each of a plurality of objects. Moreover, as in the example illustrated in FIG. 20, by transmitting the parameter configuration information for every object group, the information amount of the information such as the parameter transmitted to the decoding side, that is, the sense-of-distance control information can be further reduced.

Second Embodiment

<Configuration Example of Sense-of-Distance Control Processing Unit>

Furthermore, in the above description, an example has been described in which the configuration of the sense-of-distance control processing unit 67 provided in the decoding device 51 is determined in advance. That is, an example has been described in which one or more processing steps configuring the sense-of-distance control processing and the order of the processing which are indicated by the configuration information of the sense-of-distance control information are determined in advance.

However, the present invention is not limited thereto, and the configuration of the sense-of-distance control processing unit 67 may be freely changed by the configuration information of the sense-of-distance control information.

Figure 21:
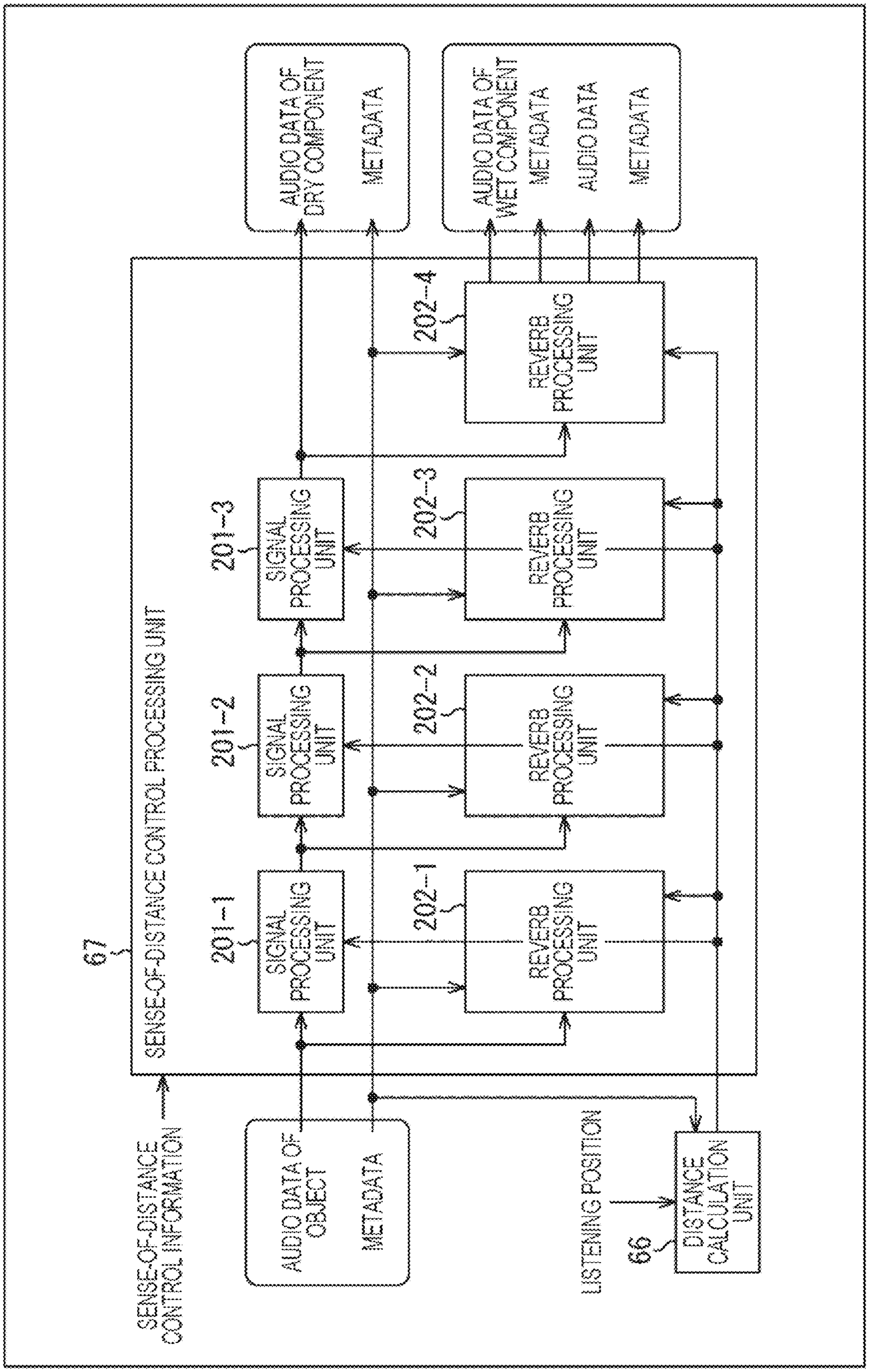
FIG. 21 is a diagram illustrating a configuration example of the sense-of-distance control processing unit.

In such a case, the sense-of-distance control processing unit 67 is configured as illustrated in FIG. 21, for example.

In the example illustrated in FIG. 21, the sense-of-distance control processing unit 67 executes a program according to the sense-of-distance control information, and realizes some processing blocks among a signal processing unit 201-1 to a signal processing unit 201-3, and a reverb processing unit 202-1 to a reverb processing unit 202-4.

The signal processing unit 201-1 performs signal processing on the audio data of the object supplied from the object decoding unit 62 on the basis of the distance information supplied from the distance calculation unit 66 and the sense-of-distance control information supplied from the sense-of-distance control information decoding unit 64, and supplies the resultant audio data to the signal processing unit 201-2.

At this time, in a case where the reverb processing unit 202-2 functions, that is, in a case where the reverb processing unit 202-2 is realized, the signal processing unit 201-1 also supplies the audio data obtained by the signal processing to the reverb processing unit 202-2.

The signal processing unit 201-2 performs signal processing on the audio data supplied from the signal processing unit 201-1 on the basis of the distance information supplied from the distance calculation unit 66 and the sense-of-distance control information supplied from the sense-of-distance control information decoding unit 64, and supplies the resultant audio data to the signal processing unit 201-3. At this time, in a case where the reverb processing unit 202-3 functions, the signal processing unit 201-2 also supplies the audio data obtained by the signal processing to the reverb processing unit 202-3.

The signal processing unit 201-3 performs signal processing on the audio data supplied from the signal processing unit 201-2 on the basis of the distance information supplied from the distance calculation unit 66 and the sense-of-distance control information supplied from the sense-of-distance control information decoding unit 64, and supplies the resultant audio data to the 3D audio rendering processing unit 68. At this time, in a case where the reverb processing unit 202-4 functions, the signal processing unit 201-3 also supplies the audio data obtained by the signal processing to the reverb processing unit 202-4.

Note that, hereinafter, the signal processing units 201-1 to 201-3 will also be simply referred to as signal processing units 201 in a case where it is not particularly necessary to distinguish the signal processing units.

The signal processing performed by the signal processing unit 201-1, the signal processing unit 201-2, and the signal processing unit 201-3 is the processing indicated by the configuration information of the sense-of-distance control information.

Specifically, the signal processing performed by the signal processing unit 201 is, for example, gain control processing and filter processing by the high-shelf filter, the low-shelf filter, and the like.

The reverb processing unit 202-1 performs reverb processing on the audio data of the object supplied from the object decoding unit 62 on the basis of the distance information supplied from the distance calculation unit 66 and the sense-of-distance control information supplied from the sense-of-distance control information decoding unit 64, and generates audio data of a wet component.

Furthermore, the reverb processing unit 202-1 generates the metadata including the position information of the wet component on the basis of the sense-of-distance control information supplied from the sense-of-distance control information decoding unit 64, the metadata supplied from the metadata decoding unit 63, and the listening position information supplied from the user interface 65. Note that, in the reverb processing unit 202-1, the metadata of the wet component is generated using the distance information as necessary.

The reverb processing unit 202-1 supplies the metadata and the audio data of the wet component generated in this manner to the 3D audio rendering processing unit 68.

The reverb processing unit 202-2 generates metadata and audio data of a wet component on the basis of the distance information from the distance calculation unit 66, the sense-of-distance control information from the sense-of-distance control information decoding unit 64, the audio data from the signal processing unit 201-1, the metadata from the metadata decoding unit 63, and the listening position information from the user interface 65, and supplies the generated metadata and audio data to the 3D audio rendering processing unit 68.

The reverb processing unit 202-3 generates metadata and audio data of a wet component on the basis of the distance information from the distance calculation unit 66, the sense-of-distance control information from the sense-of-distance control information decoding unit 64, the audio data from the signal processing unit 201-2, the metadata from the metadata decoding unit 63, and the listening position information from the user interface 65, and supplies the generated metadata and audio data to the 3D audio rendering processing unit 68.

The reverb processing unit 202-4 generates metadata and audio data of a wet component on the basis of the distance information from the distance calculation unit 66, the sense-of-distance control information from the sense-of-distance control information decoding unit 64, the audio data from the signal processing unit 201-3, the metadata from the metadata decoding unit 63, and the listening position information from the user interface 65, and supplies the generated metadata and audio data to the 3D audio rendering processing unit 68.

In the reverb processing unit 202-2, the reverb processing unit 202-3, and the reverb processing unit 202-4, processing similar to the case of the reverb processing unit 202-1 is performed, and the metadata and audio data of the wet component are generated.

Note that, hereinafter, the reverb processing unit 202-1 to the reverb processing unit 202-4 will also be simply referred to as a reverb processing unit 202 in a case where it is not particularly necessary to distinguish the reverb processing units.

In the sense-of-distance control processing unit 67, no reverb processing unit 202 may function, or one or more reverb processing units 202 may function.

Therefore, for example, the sense-of-distance control processing unit 67 may include the reverb processing unit 202 that generates a wet component positioned on the right and left with respect to the object (dry component) and a reverb processing unit 202 that generates a wet component positioned on the upper and lower sides with respect to the object.

As described above, the content creator can freely designate each of the signal processing steps configuring the sense-of-distance control processing and the order in which the signal processing steps are performed. Therefore, it is possible to realize the sense-of-distance control based on the intention of the content creator.

<Another Example of Sense-of-Distance Control Information>

Furthermore, in a case where the configuration of the sense-of-distance control processing unit 67 can be freely changed (designated) as illustrated in FIG. 21, the sense-of-distance control information has the configuration illustrated in FIG. 22, for example.

In the example illustrated in FIG. 22, "num_objs" indicates the number of objects included in the content, and in the sense-of-distance control information, flags "isDistanceRenderFlg" indicating whether or not the object is the target of the sense-of-distance control are included as many as the number num_objs of the objects.

Note that the number num_objs of these objects and the flag isDistanceRenderFlg are similar to those in the example illustrated in FIG. 19, and thus the description thereof will be omitted.

In a case where the value of the flag isDistanceRenderFlg of the i-th object is "1", the sense-of-distance control information includes id information "proc_id" indicating signal processing and parameter configuration information for each of the signal processing steps configuring the sense-of-distance control processing to be performed on the object.

That is, for example, in accordance with the id information "proc_id" indicating j-th (where $0 \le j < 4$) signal processing, the parameter configuration information "DistanceRender_Attn( )" of the gain control processing, the parameter configuration information "DistanceRender_Filt( )" of the filter processing, the parameter configuration information "DistanceRender_Revb( )" of the reverb processing, or parameter configuration information "DistanceRender_UserDefine( )" of user definition processing is included in the sense-of-distance control information.

Specifically, for example, in a case where the id information "proc_id" is "ATTN" indicating the gain control processing, the parameter configuration information "DistanceRender_Attn( )" of the gain control processing is included in the sense-of-distance control information.

Note that the parameter configuration information "DistanceRender_Attn( )", "DistanceRender_Filt( )", and "DistanceRender_Revb( )" is similar to the case in FIG. 11, and thus description thereof is omitted.

Furthermore, the parameter configuration information "DistanceRender_UserDefine( )" indicates parameter configuration information indicating the control rule of the parameter used in the user definition processing which is signal processing arbitrarily defined by the user.

Therefore, in this example, in addition to the gain control processing, the filter processing, and the reverb processing, the user definition processing separately defined by the user can be added as the signal processing configuring the sense-of-distance control processing.

Note that, here, a case where the number of the signal processing steps configuring the sense-of-distance control processing is four has been described as an example, but the number of the signal processing steps configuring the sense-of-distance control processing may be any number.

In the sense-of-distance control information illustrated in FIG. 22, for example, when 0-th signal processing configuring the sense-of-distance control processing is set to the gain control processing, first signal processing is set to the filter processing by the high-shelf filter, second signal processing is set to the filter processing by the low-shelf filter, and third signal processing is set to the reverb processing, the sense-of-distance control processing unit 67 having the same configuration as that illustrated in FIG. 3 is realized.

In such a case, in the sense-of-distance control processing unit 67 illustrated in FIG. 21, the signal processing unit 201-1 to the signal processing unit 201-3 and the reverb processing unit 202-4 are realized, and the reverb processing unit 202-1 to the reverb processing unit 202-3 are not realized (do not function).

Then, the signal processing unit 201-1 to the signal processing unit 201-3, and the reverb processing unit 202-4 function as the gain control unit 101, the high-shelf filter processing unit 102, the low-shelf filter processing unit 103, and the reverb processing unit 104 illustrated in FIG. 3.

Figure 16:
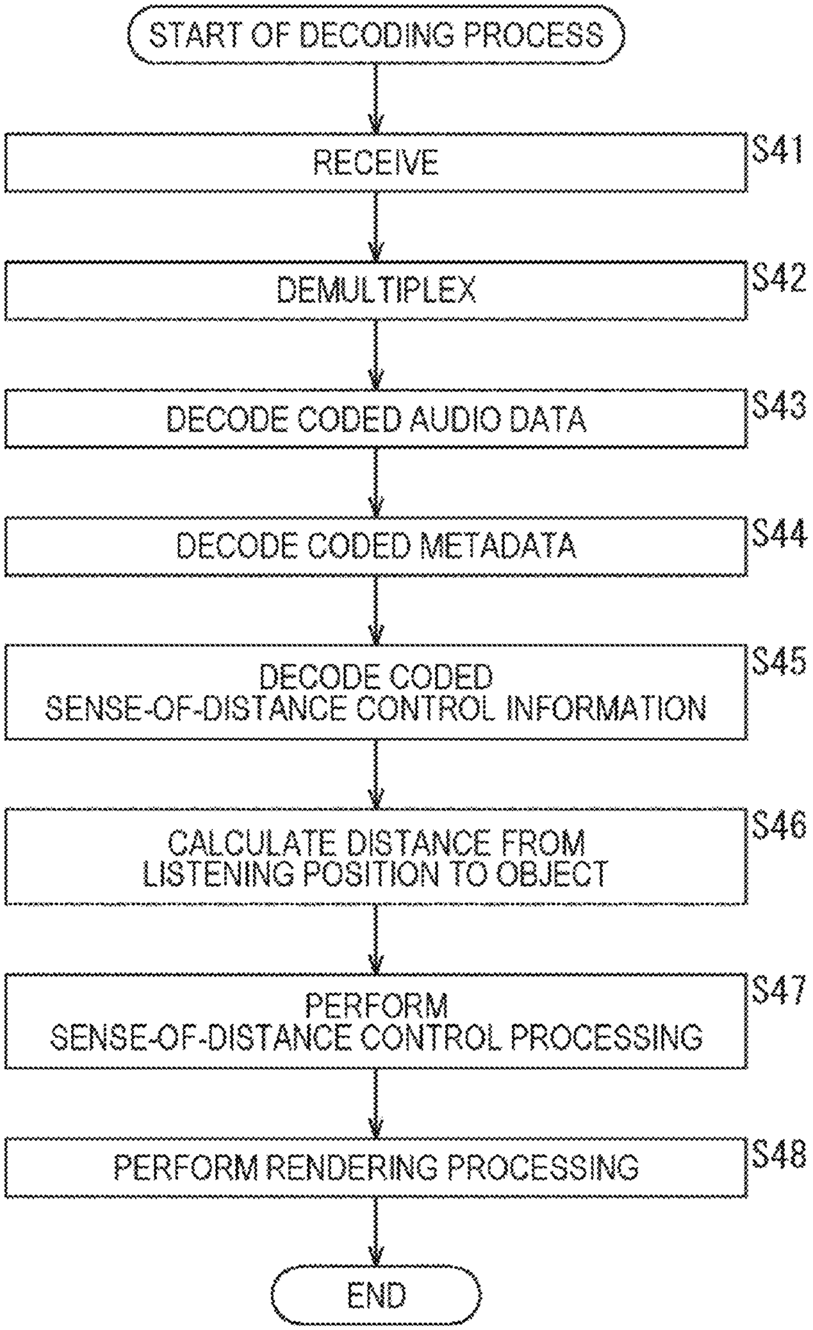
FIG. 16 is a flowchart for describing a decoding process.

As described above, even in a case where the sense-of-distance control information has the configuration illustrated in FIG. 22, basically, the encoding device 11 performs the encoding process described with reference to FIG. 15, and the decoding device 51 performs the decoding process described with reference to FIG. 16.

However, in the encoding process, for example, in step S13, for every object, whether or not the object is to be subjected to the sense-of-distance control processing, the configuration of the sense-of-distance control processing, and the like are determined, and in step S14, the sense-of-distance control information having the configuration illustrated in FIG. 22 is encoded.

On the other hand, in the decoding process, in step S47, the configuration of the sense-of-distance control processing unit 67 is determined for every object on the basis of the sense-of-distance control information having the configuration illustrated in FIG. 22, and the sense-of-distance control processing is appropriately performed.

As described above, according to the present technology, the sense-of-distance control information is transmitted to the decoding side together with the audio data of the object according to the setting of the content creator or the like, whereby the sense-of-distance control based on the intention of the content creator can be realized in the object-based audio.

<Configuration Example of Computer>

By the way, the series of processes described above can be executed by hardware but can also be executed by software. In a case where the series of processing is executed by software, a program configuring the software is installed in a computer. Here, the computer includes a computer incorporated in dedicated hardware, a general-purpose personal computer capable of executing various functions by installing various programs, and the like, for example.

Figure 23:
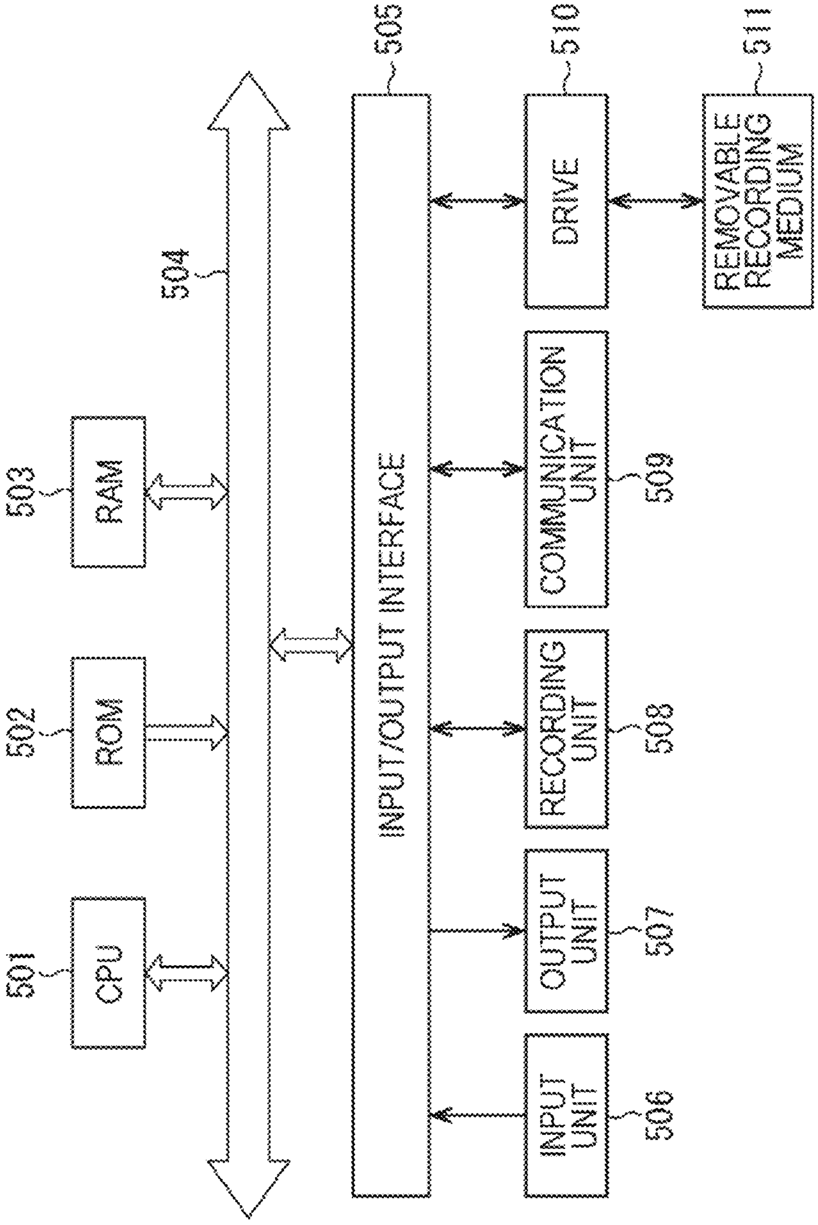
FIG. 23 is a diagram illustrating a configuration example of a computer.

FIG. 23 is a block diagram illustrating a configuration example of the hardware of the computer that executes the above-described series of processing by the program.

In the computer, a central processing unit (CPU) 501, a read only memory (ROM) 502, and a random access memory (RAM) 503 are mutually connected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, the above-described series of processing is performed, for example, in such a manner that the CPU 501 loads the program recorded in the recording unit 508 into the RAM 503 via the input/output interface 505 and the bus 504 and executes the program.

For example, the program executed by the computer (CPU 501) can be recorded and provided on the removable recording medium 511 as a package medium and the like. Furthermore, the program can be provided via a wired or wireless transmission medium such as a local area network, the Internet, or digital satellite broadcasting.

In the computer, the program can be installed in the recording unit 508 via the input/output interface 505 by mounting the removable recording medium 511 to the drive 510. Furthermore, the program can be received by the communication unit 509 and installed in the recording unit 508 via a wired or wireless transmission medium. In addition, the program can be installed in advance in the ROM 502 or the recording unit 508.

Note that the program executed by the computer may be a program in which processing is performed in time series in the order described in this description or a program in which processing is performed in parallel or at a necessary timing such as when a call is made.

Furthermore, the embodiments of the present technology are not limited to the above-described embodiments, and various modifications can be made without departing from the gist of the present technology.

For example, the present technology can be configured as cloud computing in which one function is shared by a plurality of devices via a network and jointly processed.

Furthermore, each step described in the above-described flowcharts can be executed by one device or shared by a plurality of devices.

Moreover, in a case where one step includes a plurality of processes, the plurality of processes included in the one step can be executed by one device or shared by a plurality of devices.

Moreover, the present technology can have the following configurations.

(1)

An encoding device including:

an object encoding unit that encodes audio data of an object;

a metadata encoding unit that encodes metadata including position information of the object;

a sense-of-distance control information determination unit that determines sense-of-distance control information for sense-of-distance control processing to be performed on the audio data;

a sense-of-distance control information encoding unit that encodes the sense-of-distance control information; and a multiplexer that multiplexes the coded audio data, the coded metadata, and the coded sense-of-distance control information to generate coded data.

(2)

The encoding device according to (1), in which the sense-of-distance control information includes control rule information for obtaining a parameter used in the sense-of-distance control processing.

(3)

The encoding device according to (2), in which the parameter changes according to a distance from a listening position to the object.

(4)

The encoding device according to (2) or (3), in which the control rule information is an index indicating a function or a table for obtaining the parameter.

(5)

The encoding device according to any one of (2) to (4), in which the sense-of-distance control information includes configuration information indicating one or more processing steps which are performed in combination to realize the sense-of-distance control processing.

(6)

The encoding device according to (5), in which the configuration information is information indicating the one or more processing steps and an order of performing the one or more processing steps.

(7)

The encoding device according to (5) to (6), in which the processing is gain control processing, filter processing, or reverb processing.

(8)

The encoding device according to any one of (1) to (7), in which the sense-of-distance control information encoding unit encodes the sense-of-distance control information for each of a plurality of the objects.

(9)

The encoding device according to any one of (1) to (7), in which the sense-of-distance control information encoding unit encodes the sense-of-distance control information for every object group including one or a plurality of the objects.

(10)

An encoding method performed by an encoding device, the method including:

encoding audio data of an object;

encoding metadata including position information of the object;

determining sense-of-distance control information for sense-of-distance control processing to be performed on the audio data;

encoding the sense-of-distance control information; and multiplexing the coded audio data, the coded metadata, and the coded sense-of-distance control information to generate coded data.

(11)

A program for causing a computer to execute processing including the steps of:

encoding audio data of an object;

encoding metadata including position information of the object;

determining sense-of-distance control information for sense-of-distance control processing to be performed on the audio data;

encoding the sense-of-distance control information; and multiplexing the coded audio data, the coded metadata, and the coded sense-of-distance control information to generate coded data.

(12)

A decoding device including:

a demultiplexer that demultiplexes coded data to extract coded audio data of an object, coded metadata including position information of the object, and coded sense-of-distance control information for sense-of-distance control processing to be performed on the audio data;

an object decoding unit that decodes the coded audio data;

a metadata decoding unit that decodes the coded metadata;

a sense-of-distance control information decoding unit that decodes the coded sense-of-distance control information;

a sense-of-distance control processing unit that performs the sense-of-distance control processing on the audio data of the object on the basis of the sense-of-distance control information; and a rendering processing unit that performs rendering processing on the basis of the audio data obtained by the sense-of-distance control processing and the metadata to generate reproduction audio data for reproducing a sound of the object.

(13)

The decoding device according to (12), in which the sense-of-distance control processing unit performs the sense-of-distance control processing on the basis of a parameter obtained from control rule information included in the sense-of-distance control information and a listening position.

(14)

The decoding device according to (13), in which the parameter changes according to a distance from the listening position to the object.

(15)

The decoding device according to (13) or (14), in which the sense-of-distance control processing unit adjusts the parameter according to a reproduction environment of the reproduction audio data.

(16)

The decoding device according to any one of (13) to (15), in which the sense-of-distance control processing unit performs, on the basis of the parameter, the sense-of-distance control processing in which one or more processing steps indicated by the sense-of-distance control information is combined.

(17)

The decoding device according to (16), in which the processing is gain control processing, filter processing, or reverb processing.

(18)

The decoding device according to any one of (12) to (17), in which the sense-of-distance control processing unit generates audio data of a wet component of the object by the sense-of-distance control processing.

(19)

A decoding method performed by a decoding device, the method including:

demultiplexing coded data to extract coded audio data of an object, coded metadata including position information of the object, and coded sense-of-distance control information for sense-of-distance control processing to be performed on the audio data;

decoding the coded audio data;

decoding the coded metadata;

decoding the coded sense-of-distance control information;

performing the sense-of-distance control processing on the audio data of the object on the basis of the sense-of-distance control information; and performing rendering processing on the basis of the audio data obtained by the sense-of-distance control processing and the metadata to generate reproduction audio data for reproducing a sound of the object.

(20)

A program for causing a computer to execute processing including the steps of:

demultiplexing coded data to extract coded audio data of an object, coded metadata including position information of the object, and coded sense-of-distance control information for sense-of-distance control processing to be performed on the audio data;

decoding the coded audio data;

decoding the coded metadata;

decoding the coded sense-of-distance control information;

performing the sense-of-distance control processing on the audio data of the object on the basis of the sense-of-distance control information; and performing rendering processing on the basis of the audio data obtained by the sense-of-distance control processing and the metadata to generate reproduction audio data for reproducing a sound of the object.

REFERENCE SIGNS LIST

11 Encoding device
21 Object encoding unit
22 Metadata encoding unit
23 Sense-of-distance control information determination unit
24 Sense-of-distance control information encoding unit
25 Multiplexer
51 Decoding device
61 Demultiplexer
62 Object decoding unit
63 Metadata decoding unit
64 Sense-of-distance control information decoding unit
66 Distance calculation unit
67 Sense-of-distance control processing unit
68 3D audio rendering processing unit
101 Gain control unit
102 High-shelf filter processing unit
103 Low-shelf filter processing unit
104 Reverb processing unit

The invention claimed is:

1. An encoding device comprising:
a processing circuitry configured to:
encode audio data of an object;
encode metadata including position information of the object;
determine sense-of-distance control information for sense-of-distance control processing to be performed on the audio data;
encode the sense-of-distance control information; and
multiplex the encoded audio data, the encoded metadata, and the encoded sense-of-distance control information to generate coded data, wherein the sense-of-distance control information includes control rule information for obtaining a parameter used in the sense-of-distance control processing, and wherein the control rule information includes a plurality of change control points, each change control point having a distance value and an associated parameter value, the distance value defining a distance from a listening position to the object at which the control rules change from a first control rule to a second control rule different from the first control rule, and the parameter value defining a value of the parameter at the associated distance value.

2. The encoding device according to claim 1,
wherein the parameter changes according to the distance from the listening position to the object.

3. The encoding device according to claim 1,
wherein the control rule information includes an index indicating a function or a table for obtaining the parameter.

4. The encoding device according to claim 1,
wherein the sense-of-distance control information includes configuration information indicating one or more processing steps which are performed in combination to realize the sense-of-distance control processing.

5. The encoding device according to claim 4,
wherein the configuration information includes information indicating the one or more processing steps and an order of performing the one or more processing steps.

6. The encoding device according to claim 4,
wherein the processing includes gain control processing, filter processing, or reverb processing.

7. The encoding device according to claim 1,
wherein the processing circuitry is configured to encode the sense-of-distance control information for each of a plurality of objects.

8. The encoding device according to claim 1,
wherein the processing circuitry is configured to encode the sense-of-distance control information for every object group including one or a plurality of objects.

9. An encoding method performed by an encoding device, the method comprising:
encoding audio data of an object;
encoding metadata including position information of the object;
determining sense-of-distance control information for sense-of-distance control processing to be performed on the audio data;
encoding the sense-of-distance control information; and
multiplexing the encoded audio data, the encoded metadata, and the encoded sense-of-distance control information to generate coded data, wherein the sense-of-distance control information includes control rule information for obtaining a parameter used in the sense-of-distance control processing, and wherein the control rule information includes a plurality of change control points, each change control point having a distance value and an associated parameter value, the distance value defining a distance from a listening position to the object at which the control rules change from a first control rule to a second control rule different from the first control rule, and the parameter value defining a value of the parameter at the associated distance value.

10. A non-transitory computer readable medium storing instructions that, when executed by processing circuitry, perform an encoding method comprising:
encoding audio data of an object;
encoding metadata including position information of the object;
determining sense-of-distance control information for sense-of-distance control processing to be performed on the audio data;
encoding the sense-of-distance control information; and
multiplexing the encoded audio data, the encoded metadata, and the encoded sense-of-distance control information to generate coded data, wherein the sense-of-distance control information includes control rule information for obtaining a parameter used in the sense-of-distance control processing, and wherein the control rule information includes a plurality of change control points, each change control point having a distance value and an associated parameter value, the distance value defining a distance from a listening position to the object at which the control rules change from a first control rule to a second control rule different from the first control rule, and the parameter value defining a value of the parameter at the associated distance value.

11. A decoding device comprising:
processing circuitry configured to:
demultiplex coded data to extract coded audio data of an object, coded metadata including position information of the object, and coded sense-of-distance control information for sense-of-distance control processing to be performed on the audio data;

decode the coded audio data;

decode the coded metadata;

decode the coded sense-of-distance control information;

perform the sense-of-distance control processing on the audio data of the object on a basis of the sense-of-distance control information; and perform rendering processing on a basis of the audio data obtained by the sense-of-distance control processing and the metadata to generate reproduction audio data for reproducing a sound of the object, wherein the processing circuitry is configured to perform the sense-of-distance control processing on a basis of a parameter obtained from control rule information included in the sense-of-distance control information and a listening position, and wherein the control rule information includes a plurality of change control points, each change control point having a distance value and an associated parameter value, the distance value defining a distance from a listening position to the object at which the control rules change from a first control rule to a second control rule different from the first control rule, and the parameter value defining a value of the parameter at the associated distance value.

12. The decoding device according to claim 11, wherein the parameter changes according to the distance from the listening position to the object.

13. The decoding device according to claim 11, wherein the processing circuitry is configured to adjust the parameter according to a reproduction environment of the reproduction audio data.

14. The decoding device according to claim 11, wherein the processing circuitry is configured to perform, on a basis of the parameter, the sense-of-distance control processing in which one or more processing steps indicated by the sense-of-distance control information is combined.

15. The decoding device according to claim 14, wherein the processing includes gain control processing, filter processing, or reverb processing.

16. The decoding device according to claim 11, wherein the processing circuitry is configured to generate audio data of a wet component of the object by the sense-of-distance control processing.

17. A decoding method performed by a decoding device, the method comprising:

demultiplexing coded data to extract coded audio data of an object, coded metadata including position information of the object, and coded sense-of-distance control information for sense-of-distance control processing to be performed on the audio data;

decoding the coded audio data;

decoding the coded metadata;

decoding the coded sense-of-distance control information;

performing the sense-of-distance control processing on the audio data of the object on a basis of the sense-of-distance control information; and performing rendering processing on a basis of the audio data obtained by the sense-of-distance control processing and the metadata to generate reproduction audio data for reproducing a sound of the object, wherein the sense-of-distance control processing is performed on a basis of a parameter obtained from control rule information included in the sense-of-distance control information and a listening position, and wherein the control rule information includes a plurality of change control points, each change control point having a distance value and an associated parameter value, the distance value defining a distance from a listening position to the object at which the control rules change from a first control rule to a second control rule different from the first control rule, and the parameter value defining a value of the parameter at the associated distance value.

18. A non-transitory computer readable medium storing instructions that, when executed by processing circuitry, perform a decoding method comprising:

demultiplexing coded data to extract coded audio data of an object, coded metadata including position information of the object, and coded sense-of-distance control information for sense-of-distance control processing to be performed on the audio data;

decoding the coded audio data;

decoding the coded metadata;

decoding the coded sense-of-distance control information;

performing the sense-of-distance control processing on the audio data of the object on a basis of the sense-of-distance control information; and performing rendering processing on a basis of the audio data obtained by the sense-of-distance control processing and the metadata to generate reproduction audio data for reproducing a sound of the object, wherein the sense-of-distance control processing is performed on a basis of a parameter obtained from control rule information included in the sense-of-distance control information and a listening position, and wherein the control rule information includes a plurality of change control points, each change control point having a distance value and an associated parameter value, the distance value defining a distance from a listening position to the object at which the control rules change from a first control rule to a second control rule different from the first control rule, and the parameter value defining a value of the parameter at the associated distance value.

* * * * *